United States Patent [19]

Obata et al.

[11] Patent Number: 5,661,634

[45] Date of Patent: Aug. 26, 1997

[54] INFORMATION PROCESSING SYSTEM USING PORTABLE TERMINAL UNIT AND DATA COMMUNICATION ADAPTER THEREFOR

[75] Inventors: Takao Obata; Mitsuaki Kumagai, both of Inagi; Akihiko Iura, Kawasaki; Akio Murata, Kawasaki; Shinji Yamamoto, Kawasaki; Makoto Sato; Akira Okawado, both of Inagi; Shinichiro Tsurumaru, Kawasaki; Maki Miyata, Yokohama; Toshiyuki Kobayashi, Inagi; Nobuaki Akasawa, Inagi; Masahiko Okano, Inagi; Takao Miyanaga, Inagi, all of Japan

[73] Assignee: Fujitsu Limited, Kawasaki, Japan

[21] Appl. No.: 333,559

[22] Filed: Oct. 31, 1994

[30] Foreign Application Priority Data

| Nov. 9, 1993 | [JP] | Japan | 5-279846 |
| Nov. 9, 1993 | [JP] | Japan | 5-304834 |
| Nov. 9, 1993 | [JP] | Japan | 5-304835 |
| Nov. 9, 1993 | [JP] | Japan | 5-304836 |
| Nov. 9, 1993 | [JP] | Japan | 5-304837 |

[51] Int. Cl.$^6$ .............................. G06F 1/16; H05K 7/16
[52] U.S. Cl. .............................. 361/684; 439/73; 361/726; 361/737
[58] Field of Search .............................. 361/683, 684, 361/685, 686, 610, 737, 726, 727, 724, 725, 755, 807, 809; 364/708.1; 439/70, 73; 235/492, 495, 380, 472; G06F 1/16

[56] References Cited

U.S. PATENT DOCUMENTS

| 4,870,604 | 9/1989 | Tatsuno | 364/708.1 |
| 5,220,520 | 6/1993 | Kessoku | 361/684 |
| 5,355,357 | 10/1994 | Yamamori et al. | 361/680 |

FOREIGN PATENT DOCUMENTS

| 62-44891 | 2/1987 | Japan . |
| 62-185293 | 8/1987 | Japan . |
| 62-267814 | 11/1987 | Japan . |
| 1-211875 | 8/1989 | Japan . |
| 5-47436 | 2/1993 | Japan . |
| 6161601 | 6/1994 | Japan | G06F 1/16 |

Primary Examiner—Leo P. Picard
Assistant Examiner—Lynn D. Feild
Attorney, Agent, or Firm—Nikaido, Marmelstein, Murray & Oram LLP

[57] ABSTRACT

In an information processing system having a portable terminal unit, such as a hand-held computer, driven by a rechargeable battery and a data communication adaptor for enabling communication between the portable terminal unit and a host computer of the system, the terminal unit and the data communication adaptor are designed to minimize the size thereof in the following five ways. First, a memory card holding mechanism for connecting the memory card of the portable terminal unit is provided between a swinging back lid and a recess of the back casing. Second, a normal interface and a high-speed interface are both provided in the portable terminal unit and the the data communication adaptor respectively. Third, an auxiliary connector for an optimal device to extend a function of the portable terminal unit is provided in the opening of the casing of the portable terminal unit movable in three dimensions mounted on a printed circuit board. Fourth, a moisture resistant seal made of rubber or resin is molded integrally onto one of the joining edges of an upper casing and a lower casing. Fifth, an electric power source portion of the data communication adaptor is used not only for charging the battery of the portable terminal unit but also supplying a power adequate for enabling a data transmission operation thereof.

2 Claims, 22 Drawing Sheets

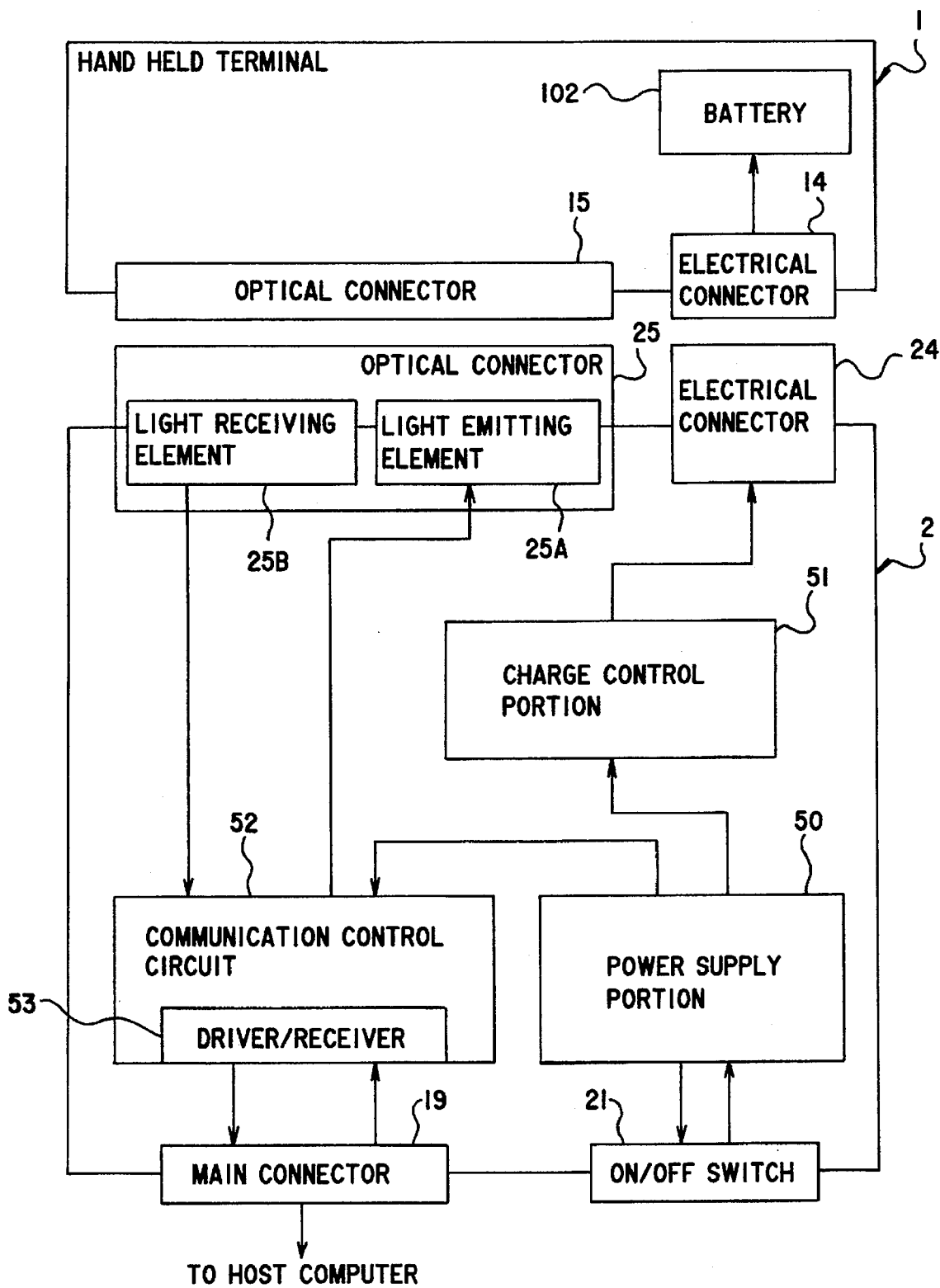

INFORMATION PROCESSING SYSTEM USING PORTABLE TERMINAL UNIT AND DATA COMMUNICATION ADAPTER THEREFOR

BACKGROUND OF THE INVENTION

1. Field of the Invention

The present invention relates to an information processing system using a portable terminal unit and a data communication adapter therefor.

2. Description of the Related Art

In recent years, portable terminal units such as hand-held terminals (HHTs) are widely used for managing commodities, reading gas and electric meters, and the like.

Generally, a hand-held terminal has a keyboard to input data, a display such as a liquid crystal display, and a printer. Various data are entered into the hand-held terminal, and the entered data are displayed. Since the hand-held terminal is hand-carried, it is designed to be compact and light. A hand-held terminal often employs a memory card such as an IC card as an external storage medium. The memory card stores data entered into the hand-held terminal. The memory card is usually installed in the hand-held terminal from an upper end or a lower end thereof by a memory card loading mechanism installed therein.

However, the locations of the keyboard, the display, and the printer are more or less limited due to the method of use conditions thereof. Further, the hand-held terminal usually incorporates a battery, a modem for communicating data to a larger apparatus, and a connector for connecting the hand-held terminal to the larger apparatus whose position is generally fixed. Accordingly, the position for inserting the memory card is also limited and the width and thickness of the hand-held terminal may be increased by the installation of the memory card, thus having a negative effect on the compactness of the hand-held terminal.

In addition to designing a hand-held terminal that is compact and light, the hand-held terminal is required to have high-performance. Usually, the hand-held terminal is provided with an optical connector to communicate with a larger apparatus by using a transmission adapter. That is, the data input into the hand-held terminal are transmitted to a larger apparatus by connecting the hand-held terminal to a transmission adapter.

Conventionally, when the hand-held terminal communicates with the higher apparatus, an RS232C interface is used. Further, to reduce the size of the hand-held terminal, the prior art multiplexes RS232C interface signals and uses a pair of light emitting and receiving elements to send and receive data. If the hand-held terminal employs a large capacity memory, it must employ a high-speed interface to transmit data at high speed.

High-speed data transmission can be realized by employing a new interface and a connector dedicated to the interface. Installing these additional elements in addition to the conventional RS232C interface, however, is disadvantageous in terms of the compactness and light weight of the portable terminal unit.

Further, the conventional hand-held terminal is equipped with an electrical connector for connecting an external optional device. For example, a card reader for reading a magnetic card may be attached to the hand-held terminal as an optical device to add a function that is not originally present in the hand-held terminal. In this case, the external optional device is connected to the hand-held terminal with connectors and may be fixed thereto with at least one screw.

The connectors are fixed to the respective apparatuses or to printed circuit boards of the respective apparatuses. When connecting the apparatuses together, the connectors must be accurately positioned in relation to each other. This makes the connection work complicated.

In addition, connection of the external optional device makes the size of the hand-held terminal larger when the position of the connector on the hand-held terminal is not proper.

Incidentally, since the hand-held terminal can be used under various conditions, they should be sealed to prevent moisture or liquids from entering the terminal. The hand-held terminal may have a moisture resistant seal made of, for example, rubber. The seal is generally held between an upper casing and a lower casing of the hand-held terminal.

The lower part of the hand-held terminal may be provided with a connector to be connected to an external device and a jack for charging a battery incorporated in the hand-held terminal. The connector and jack may be provided with a moisture-and-dust-resistant cover made of rubber or resin. When transmitting data to an external device or when charging the battery, the covers are removed. Since the removed covers may be lost, to prevent this, there may be provided a notch on the casing and a T-shaped projection on the cover. The T-shaped projection of the cover can then be inserted into the notch of the casing, to fix the cover to the casing. The cover is sometimes extended therefrom to cover an interface connector.

However, the prior art that puts rubber between an upper casing and a lower casing provides poor workability and makes the size of the housing of the hand-held terminal larger. That is, the rubber must be made large enough to prevent the rubber from peeling off and moisture from penetrating. Further, if the T-shaped projection of the connector cover is loose in the notch, the projection may easily slip out of the notch of the casing, to cause the cover to be lost and provide poor moisture resistance.

Since the above-described hand-held terminals are usually carried around, they usually employ batteries, in particular, rechargeable batteries, as a power source.

The transmission adapter is interposed between the hand-held terminal and the larger apparatus, to transmit data from the hand-held terminal to the larger apparatus, or from the larger apparatus to the hand-held terminal. The hand-held terminal and transmission adapter may be connected to each other through optical connectors using on interface such as a RS232C interfaces.

When transmitting data to the larger apparatus, the hand-held terminal must be connected to a transmission adapter. While the hand-held terminal is connected to the transmission adapter to transmit data to the larger apparatus, the transmission adapter charges the battery of the hand-held terminal. In this case, the hand-held terminal is provided with a battery charging jack and the transmission adapter has a battery charging terminal. When the hand-held terminal is connected to the transmission adapter, the jack is connected to the terminal to start charging the battery of the hand-held terminal. Power for this charging operation is supplied by a power source circuit in the transmission adapter.

However, the transmission adapter must charge the hand-held terminal, and at the same time, carry out data transmission between the hand-held terminal and the larger apparatus. The charging operation requires a relatively large amount of power, so that the power source of the transmission adapter must have a large capacity. This results in enlarging the power source of the transmission adapter.

It is always required to minimize the hand-held terminal and transmission adapter. If the power source of the transmission adapter is large, the size of the transmission adapter cannot be minimized. Also, when the transmission adapter simultaneously carries out the charging and data transmission operations, the transmission adapter consumes a large amount of power, thereby making the power source circuit of the transmission adapter large.

SUMMARY OF THE INVENTION

The first object of the present invention is to realize a compact hand-held terminal by providing a superior memory card loading mechanism installed therein.

The second object of the present invention is to realize a compact and light hand-held terminal having an additional high-speed switchable interface in addition to the conventional RS232C interface.

The third object of the present invention is to reduce the size of the hand-held terminal so that when an external optional device is connected, the connecting process is easier.

The fourth object of the present invention is to provide a portable terminal unit having improved moisture resistance characteristics and to reduce the size of the hand-held terminal by improving the shape of the sealing rubber.

The fifth object of the present invention is to provide a transmission adapter having a compact power source and consuming little power.

In order to accomplish the above-mentioned first object according to a first aspect of the present invention, there is provided a portable terminal unit equipped with a control circuit, a keyboard, and connectors, with the unit being driven by a battery. The portable terminal unit comprises a lid provided on the back surface of the casing of the portable terminal unit whose free end is rotatably supported by an axle provided on the casing; and a memory card holding mechanism whose end is rotatably supported by another axle provided on the casing, is equipped with a connector for connecting a memory card, and is provided between the lid and a recess in the casing.

In order to accomplish the above-mentioned second object according to a second aspect of the present invention, the portable terminal unit comprises a normal interface portion provided in the control circuit of the portable terminal unit for controlling the data transmission between the host computer, a high-speed interface portion provided in the control circuit of the portable terminal unit for controlling the high-speed data transmission between the host computer, and a selector provided in the portable terminal unit for selecting the normal interface portion and the high-speed interface portion when the data transmission is executed. Further, a adaptor for the unit comprises a normal interface portion provided in the control circuit of the data communication adapter for enabling data transmission between the host computer and the portable terminal unit, a high-speed interface portion provided in the control circuit of the data communication adapter for enabling high-speed data transmission between the host computer and the portable terminal unit, and a selector provided in the data communication adapter for selecting one of the normal interface portion and the high-speed interface portion when the data transmission is executed.

In order to accomplish the above-mentioned third objects according to a third aspect of the present invention, the portable terminal unit is further equipped with an optional device for extending the function of the portable terminal unit which can be connected to the portable terminal unit by an auxiliary connector. Auxiliary connectors provided on the portable terminal unit and the optional device comprises an opening around the auxiliary connector provided in the casing, a printed circuit board positioned in the opening on which the actual connector itself is mounted, a bias means provided in the opening for biasing the printed circuit board from the bottom side to an open air side of the opening, and a stopper means provided in the opening for holding and controlling the position of the printed circuit board inside the opening.

In order to accomplish the above-mentioned fourth object according to a fourth aspect of the present invention, the casing of the portable terminal unit comprises an upper casing made of molded plastic; a lower casing made of molded plastic; and a moisture resistant seal made of rubber or resin and molded on one of the joining edges of the upper casing and the lower casing.

In order to accomplish the above-mentioned fifth objects according to a fifth aspect of the present invention, the electric power source portion of the data communication adapter further comprises a charge control circuit for controlling the charging of the battery provided in the portable terminal unit, a power source circuit for supplying power to the portable terminal unit and for used as a power source for charging the battery, a communication control circuit for enabling data transmission operation between the portable terminal unit and the host computer of the system, and a switching circuit for supplying power to the communication control circuit while the portable terminal unit and the host computer communicates with each other after releasing the connection between the charge control circuit and the portable terminal unit.

According to the information processing system using a portable terminal unit and a data communication adapter therefor of the present invention, a compact portable terminal unit can be realized.

BRIEF DESCRIPTION OF THE DRAWINGS

The present invention will be more clearly understood from the description as set forth below with reference to the accompanying drawings, wherein:

FIG. 5 is a block diagram illustrating an internal constitution of a conventional transmission adapter;

DESCRIPTION OF THE PREFERRED EMBODIMENTS

Before describing the preferred embodiments, an explanation will be given of a conventional information processing system using a portable terminal unit and a data communication adapter therefor as shown in FIGS. 1 to 5.

Figure 1:
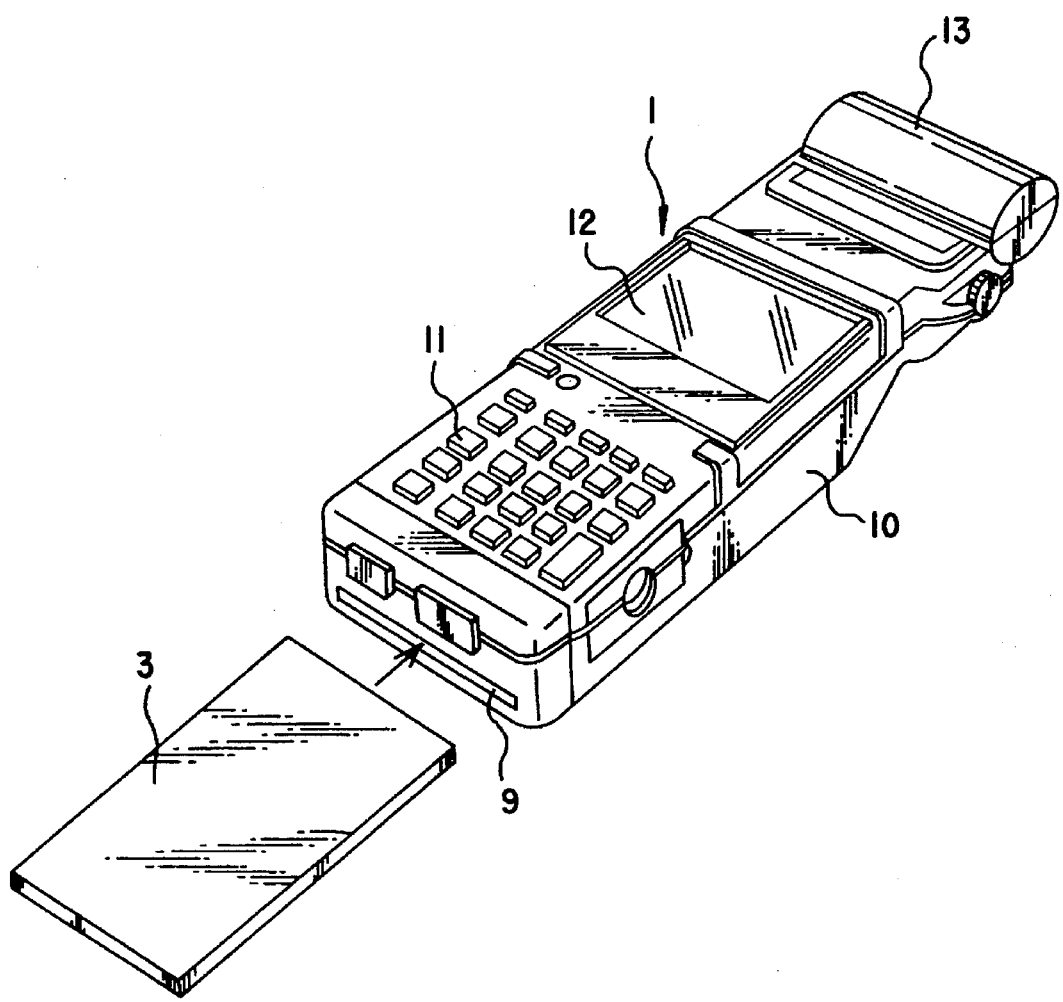
FIG. 1 is a diagram illustrating the appearance of a conventional hand-held terminal and a memory card to be inserted therein.

FIG. 1 illustrates the appearance of a hand-held terminal 1 as a portable terminal unit according to a prior art. The hand-held terminal 1 has a slot 9 for inserting a memory card 3, a keyboard 11 serving as an input device, a liquid crystal display 12 serving as a display unit, a printer 13, and some connectors. The liquid crystal display 12 has a touch panel for entering data.

Various data are entered into the hand-held terminal 1, and the entered data are displayed. Since the hand-held terminal 1 is hand-carried, it is designed to be compact and light.

The hand-held terminal 1 employs a memory card 3 such as an IC card as a removable storage medium. The memory card 3 stores data entered into the hand-held terminal 1.

The memory card 3 is usually installed in the hand-held terminal 1 from an upper end or a lower end thereof. In FIG. 1, the memory card 3 is installed in the hand-held terminal 1 through the slot 9.

The hand-held terminal 1 has the keyboard 11 serving as an input device, and the display 12. The locations of these units are more or less limited due to the use thereof. Namely, the keyboard 11 and display 12 occupy substantially all of the front face of the hand-held terminal 1. The back of the hand-held terminal 1 which is not shown is provided with an optical connector. These components will be explained later.

The hand-held terminal 1 incorporates a battery serving as a power source for the hand-held terminal 1, a printer 13 for printing data, a modem for exchanging data with a larger apparatus (host computer), and a connector for connecting the hand-held terminal 1 to the host computer. As and when required, the input data is transmitted to the host computer by connecting the hand-held terminal 1 to a transmission adapter which will be explained layer.

Among these components, the battery is usually located at the lower part of the hand-held terminal 1 and the printer 13 at the upper part thereof due to the issues of weight balance and convenience in use. For compactness, the width and thickness of the hand-held terminal 1 must be minimized. The sizes of the battery and printer 13, however, are usually fixed. Accordingly, the upper and lower parts of the hand-held terminal 1 have virtually no free space due to the battery, etc.

The connector for communicating with the host computer is usually arranged at the lower part of the hand-held terminal 1 for convenience. Accordingly, it would be nearly impossible to enable loading the memory card 3 into the hand-held terminal 1 from the upper or lower end thereof if the size of the hand-held terminal is very small. To load the memory card 3 into the hand-held terminal 1 from the upper or lower end thereof, the hand-held terminal must be thicker as shown in FIG. 1.

One possibility is to load the memory card 3 into the hand-held terminal 1 from one side thereof. However, since the length of the memory card 3 is limited according to standards, the hand-held terminal 1 would have to wide enough to enclose the length of the memory card 3 if the memory card 3 is inserted entirely into the hand-held terminal 1 from the side thereof. The increased width of the hand-held terminal 1 spoils the compactness thereof.

The hand-held terminal 1 may be widened at only a portion where the memory card 3 is inserted, however, this makes the hand-held terminal 1 partly bulky, not handy to use, limits the freedom of design and makes the unit poor in appearance.

Figure 2:
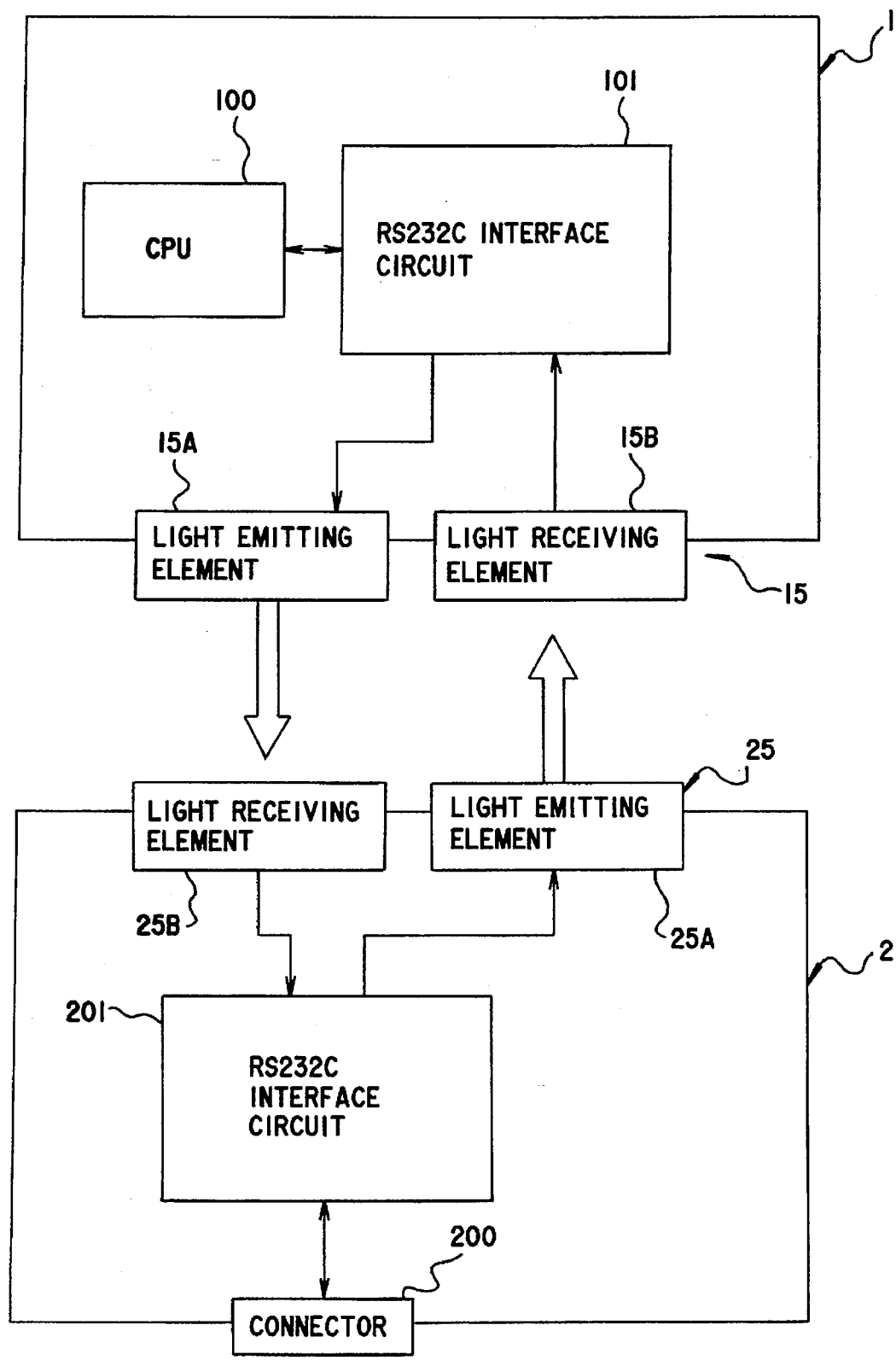
FIG. 2 is a block diagram illustrating an internal constitution of a conventional hand-held terminal and a transmission adapter.

FIG. 2 shows the inside of a hand-held terminal 1 and a transmission adapter 2 according to a prior art. The hand-held terminal 1 and the transmission adapter 2 have optical connectors 15 and 25 respectively, which send and receive data to and from each other. The optical connector 15 is comprised of a light emitting element 15A for transmitting data, and a light receiving element 15B for receiving data. The optical connector 25 is comprised of a light emitting element 25A and a light receiving element 25B.

The optical connectors 15 and 25 are non-contact connectors, which are stable even if the hand-held terminal 1 is repeatedly attached to and detached from the transmission adapter 2. To transmit data to a larger apparatus (host computer), the hand-held terminal 1 is set on the transmission adapter 2.

These apparatuses have, for example, RS232C interface circuits 101 and 201, and CPU 100 for totally controlling the hand-held terminal 1. To reduce the size of the hand-held terminal 1, the prior art multiplexes RS232C interface signals and uses a pair of light emitting and receiving elements 15A and 25B, and 25A and 15B.

However, if the hand-held terminal 1 employs a large capacity memory, it must employ a high-speed interface to transmit data at high speed.

High-speed data transmission can be realized by employing a new interface and a dedicated connector for the interface. Installing these additional elements in addition to the conventional RS232C interface circuit, however, is disadvantageous in terms of compactness and light weight of the portable terminal unit.

Figure 3A:
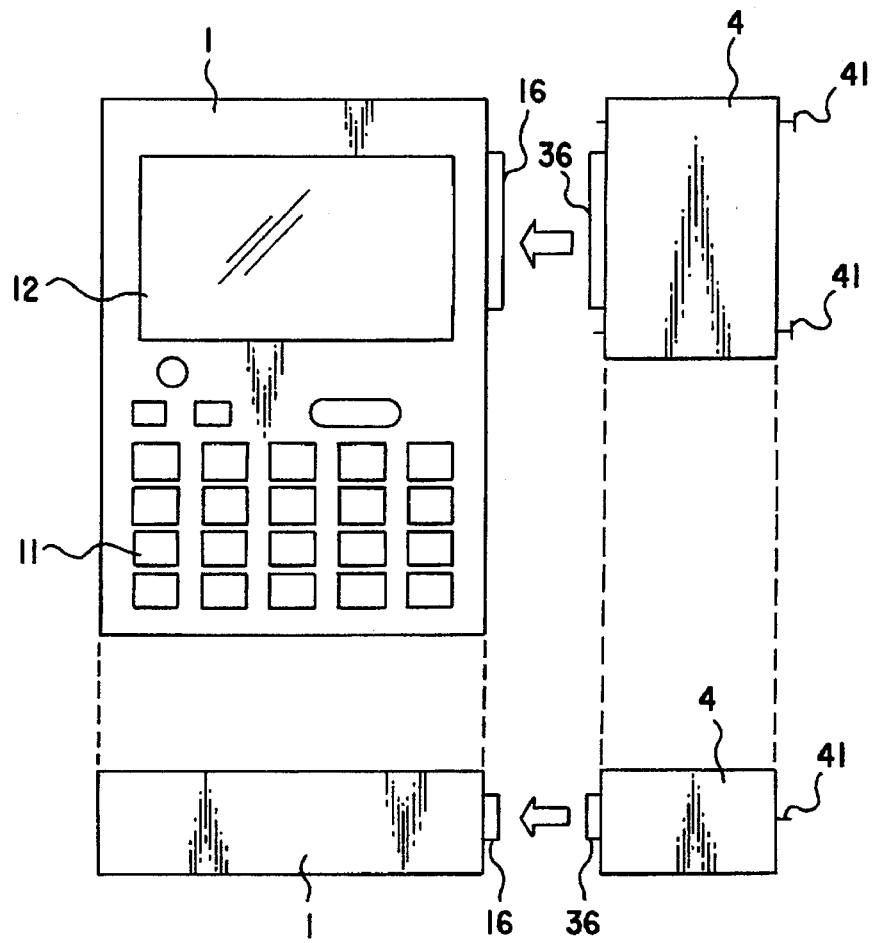
FIG. 3A is a diagram illustrating a plan view and a bottom view of a conventional hand-held terminal and an external optional device.

In order to add an optional function, an external optional device 3 can be attached to a portable terminal unit as shown in FIG. 3A. For example, a card reader for reading a magnetic cards may be attached to the hand-held terminal 1 to add a function that is not originally present in the hand-held terminal 1.

FIG. 3A shows connection between the hand-held terminal 1 having the keyboard 11 and the display unit 12, and an external optional device 4. The external optional device 4 is connected to the hand-held terminal 1 by connectors 36 and 16 and fixed together with at least one screw 41.

The connectors 16 and 36 are fixed to the respective apparatuses or to printed boards of the respective apparatuses. When connecting the apparatuses together, the connectors must be accurately positioned in relation to each other. This makes the connection work complicated.

The position of the connectors 16 and 36 on the hand-held terminal 1 and the transmission adapter 4 may fluctuate due to manufacturing errors. In the positions of the connectors 16 and 36 to be connected together deviate too much, it will be very difficult to connect them together. If the deviation is very large, it will be impossible to connect them to each other.

To solve this problem, connectors 16 and 36 must be accurately positioned in the manufacturing process. Such an accurate arrangement of the connectors 16 and 36 takes a great deal of labor and time. If the positions of connectors 16 and 36 deviate too much, the connectors 16 and 36 will be subject to excessive force when the hand-held terminal 1 and the transmission adapter 4 are fixed together with screws. This will apply stress to the fitting portions of the connectors.

Figure 3B:
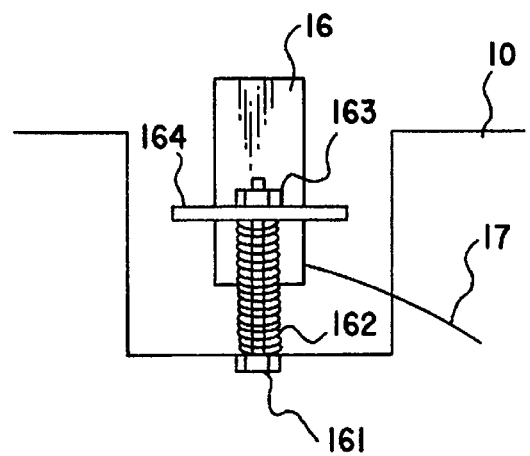
FIG. 3B is a enlarged sectional view of a connector according to a prior art.

To cope with this situation, one of the connectors 16 and 36 may be mounted flexibly on the casing. FIG. 3B shows a connector 16 fitting structure that has a certain degree of freedom in the position of a connector. This example does not fix the connector 16 to the casing 10 proper.

Threaded bolts 161 are first fixed to the casing 10. A spring 162 is arranged around each of the bolts 161. A connector 16 is set on the springs 162, and a nut 163 is set on each of the bolts 161. The springs 162 push the connector 16 upward. The connector 16 is slightly movable in a vertical direction. The diameter of the bolt 161 may be slightly smaller than that of a hole formed on a flange 164 of the connector 16 so that the connector 16 is slightly horizontally movable. Numeral 17 is a cable for connecting the connector 16 to a printed circuit board (not shown) in the hand-held terminal 1.

According to this mechanism, at least one of the connectors to be connected together is movable relative to the other, so that the accuracy in alighning the connectors need not be so accurate, and the joined connectors will not be subject to excessive stress. Compared with fixed connectors, the movable connectors easily join corresponding apparatuses together, thereby improving workability.

This mechanism, however, additionally requires the processes of fitting bolts 161 and inserting springs 162, which increases labor and time required in manufacturing.

Figure 4A:
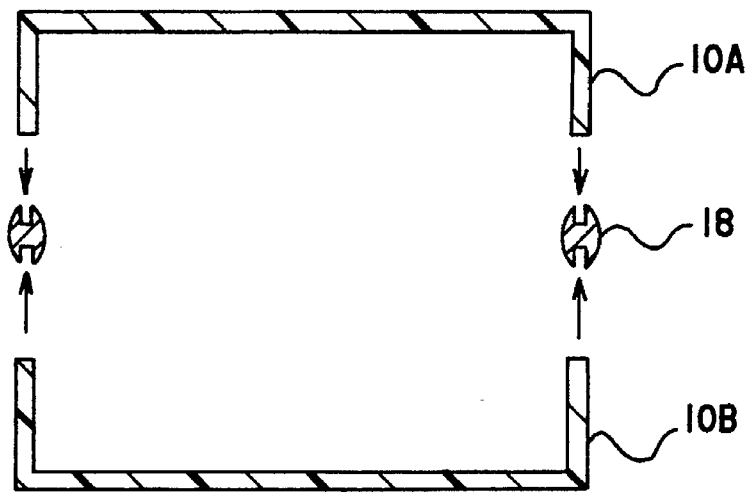
FIG. 4A is a cross-sectional view showing an upper casing, lower casing and a rubber seal according to a prior art.
Figure 4B:
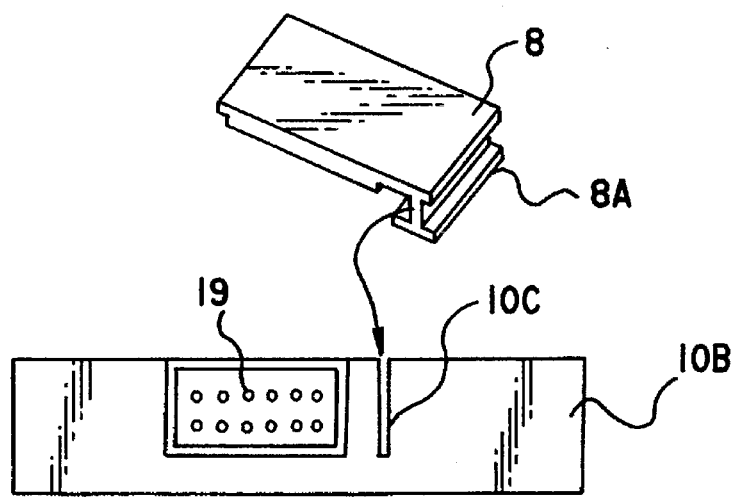
FIG. 4B is explanatory view showing a connection of lower casing and a connector cover according to a prior art.

Usually, the hand-held terminal 1 has a moisture resistant seal 18 as shown in FIG. 4A made from, for example, rubber. The moisture resistant seal 18 is held between an upper casing 10A and a lower casing 10B of the hand-held terminal 1.

The lower part of the hand-held terminal 1 is provided with connectors to be connected to an external device and for charging a battery incorporated in the hand-held terminal 1. The connectors are provided with a moisture-and-dust-resistant cover made from rubber or resin. When transmitting data to an external device or when charging the battery, the covers are removed. However, the removed covers may be lost, or the covers on the connector, etc., may unexpectedly fall off. To prevent this, a prior art of FIG. 4B cuts a slot 10C in the lower casing 10B and a tab 8A on a cover 8. The tab 8A of the cover 8 is inserted into the slot 10C of the casing 10B, to fix the cover 8 to the casing 10B. The cover 8 covers the connector 19 when the connector 19 is not used.

The hand-held terminal 1 is usually provided with a buzzer for informing a user of the completion of data input. The buzzer must provide a predetermined volume of sound. For this purpose, the casing of the hand-held terminal 1 has an opening for the buzzer.

The prior art that uses rubber moisture resistant seal 18 between the upper casing 10A and the lower casing 10B provides poor workability. The moisture resistant seal 18 and casings 10A and 10B may form a gap that enables the rubber to peel off and moisture to enter the casing 10.

The connector cover 8 having the tab 8A may easily come off out of the slot 10C of the casing 10 and become lost making the casing 10 susceptible to moisture.

The buzzer opening is disadvantageous because it allows moisture to enter. To provide moisture resistance, there can be no buzzer opening. However, this results in insufficient sound volume because a buzzer installed in the hand-held terminal produces a small volume of sound.

FIG. 5 shows the transmission adapter 2 and the hand-held terminal 1 according to a prior art. Numeral 102 is a battery provided in the hand-held terminal 1, for supplying power thereto. Numeral 50 is a power supply portion (power source) provided in the transmission adapter 2. The power supply portion 50 supplies power to the transmission adapter 1 and charges the battery 102 when ON/OFF switch 21 is ON. The ON/OFF switch is turned ON when the hand-held terminal 1 is connected to the transmission adapter 2. Numeral 51 is a charge control portion for controlling the charging operation of the battery 102.

Numeral 52 is a communication control circuit for controlling communication between the hand-held terminal 1 and the host computer (not shown).

The transmission adapter 2 is interposed between the hand-held terminal 1 and the host computer, to transmit data from the hand-held terminal 1 to the host computer, or from the host computer to the hand-held terminal 1. The hand-held terminal 1 and transmission adapter 2 are connected to each other through the optical connectors 15 and 25 with the use of a interface such as an RS232C interface.

After the hand-held terminal 1 stores a given quantity of data, it must transmit the data to the host computer. The communication control circuit 52 controls data communication between the hand-held terminal 1 and the host computer. If the hand-held terminal 1 frequently transmits data to the host computer, the hand-held terminal is frequently connected to and removed from the transmission adapter. In this case, the optical connectors 15 and 25 are advantageous because they are noncontact connectors.

When transmitting data to the host computer, the hand-held terminal 1 must be connected to the transmission adapter 2. While the hand-held terminal 1 is connected to the transmission adapter 2 to transmit data to the host computer, the transmission adapter 2 charges the battery 102 of the hand-held terminal 1. The lower part of the hand-held terminal 1 is provided with an electrical connector 14 for charging battery, in addition to the optical connector 15. The transmission adapter 2 has an electrical connector 24 for charging the battery. When the hand-held terminal 1 is connected to the transmission adapter 2, the electrical connectors 14 and 24 are connected together to start charging the battery 102 of the hand-held terminal 1. Power for this charging operation is supplied by the power supply portion 50.

The transmission adapter 2 must charge the hand-held terminal 1, and at the same time, carry out data transmission between the hand-held terminal 1 and the host computer. The charging operation requires a relatively large amount of power, so that the power supply portion 50 of the transmission adapter 2 must have a large capacity. This results in enlarging the power supply portion 50 of the transmission adapter 2.

Although it is generally required to minimize the size of the hand-held terminal 1 and transmission adapter 2, if the power supply portion 50 of the transmission adapter 2 is large, the size of the transmission adapter 2 cannot be reduced.

When the transmission adapter 2 simultaneously carries out the charging and data transmission operations, the transmission adapter 2 consumes large power, and the size of the power source circuit become large.

Figure 6:
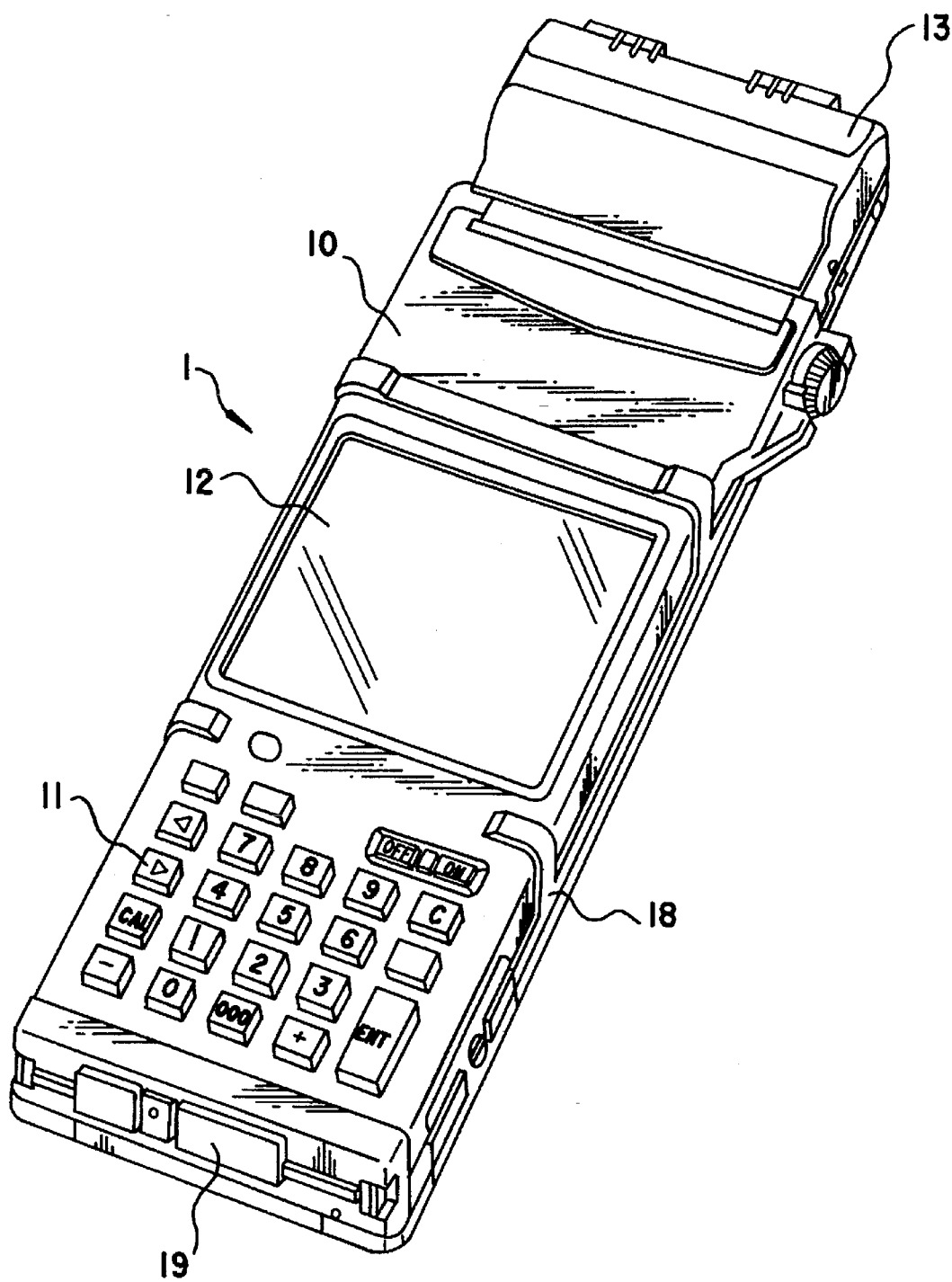
FIG. 6 is a diagram illustrating a front view of a hand-held terminal according to the present invention.

FIG. 6 is a perspective view illustrating a front face of a hand-held terminal 1 according to the present invention. In FIG. 6, numeral 10 denotes a casing of the hand-held terminal 1, 11 denotes a keyboard, 12 denotes a display unit comprised of a liquid crystal display, 13 denotes a printer, 18 denotes a moisture resistant seal, and 19 denotes a main connector for communicating with the host computer. The main connector is covered by an extended part of the moisture resistant seal 18.

Figure 7:
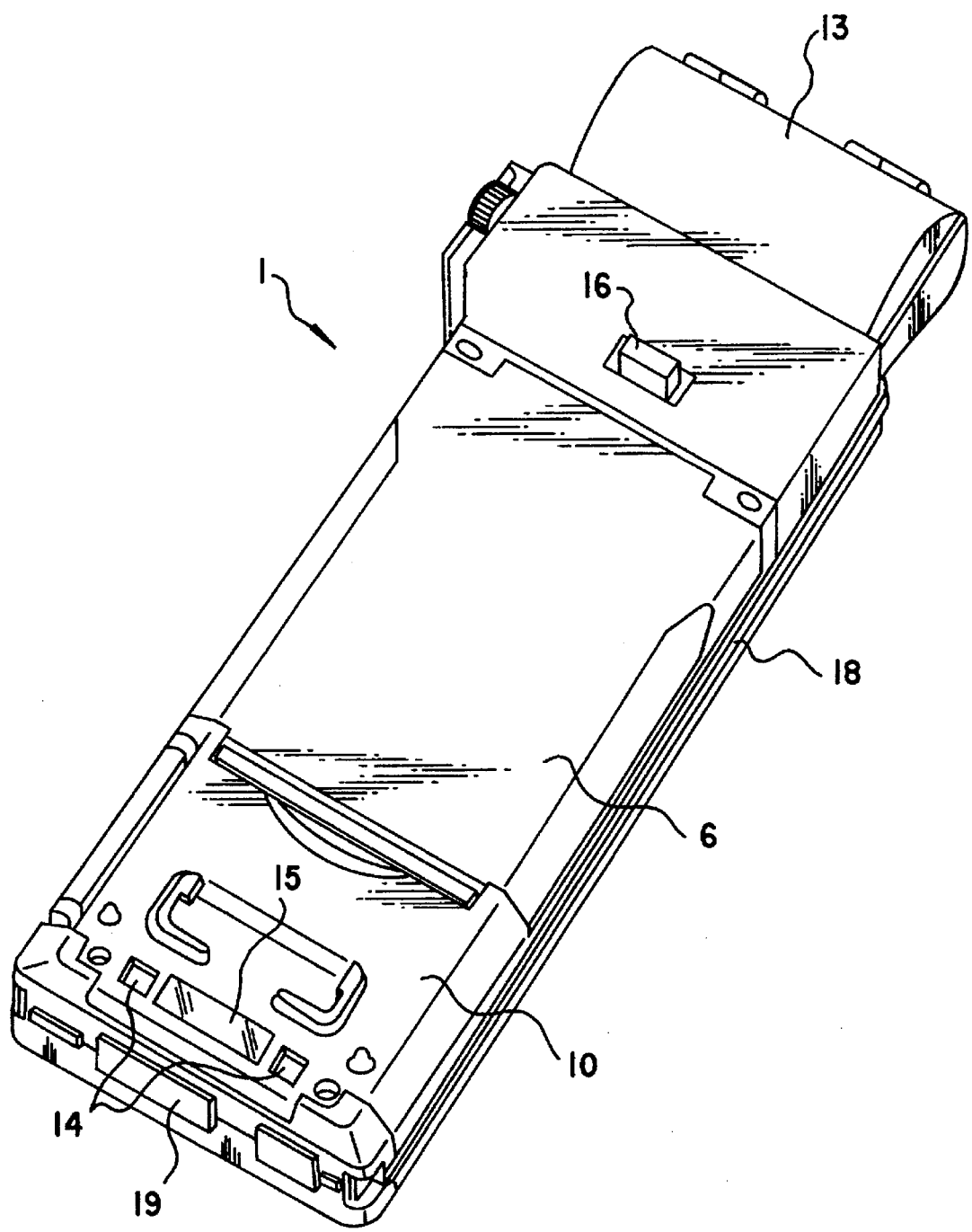
FIG. 7 is a diagram illustrating a bottom view of a hand-held terminal according to the present invention.

FIG. 7 is a perspective view illustrating a bottom face of a hand-held terminal 1 according to the present invention. In FIG. 7, numeral 6 denotes a lid, 10 denotes a casing of the hand-held terminal 1, 13 denotes a printer, 14 denotes electrical connector for providing power to the hand-held terminal 1 to operate the hand-held terminal or charge a battery, 15 denotes an optical connector for transmitting data, 16 denotes an auxiliary connector for connecting an external optional device, 18 denotes a moisture resistant seal, and 19 denotes a main connector for communicating with the host computer. The main connector is covered by an extended part of the moisture resistant seal 18.

Figure 8:
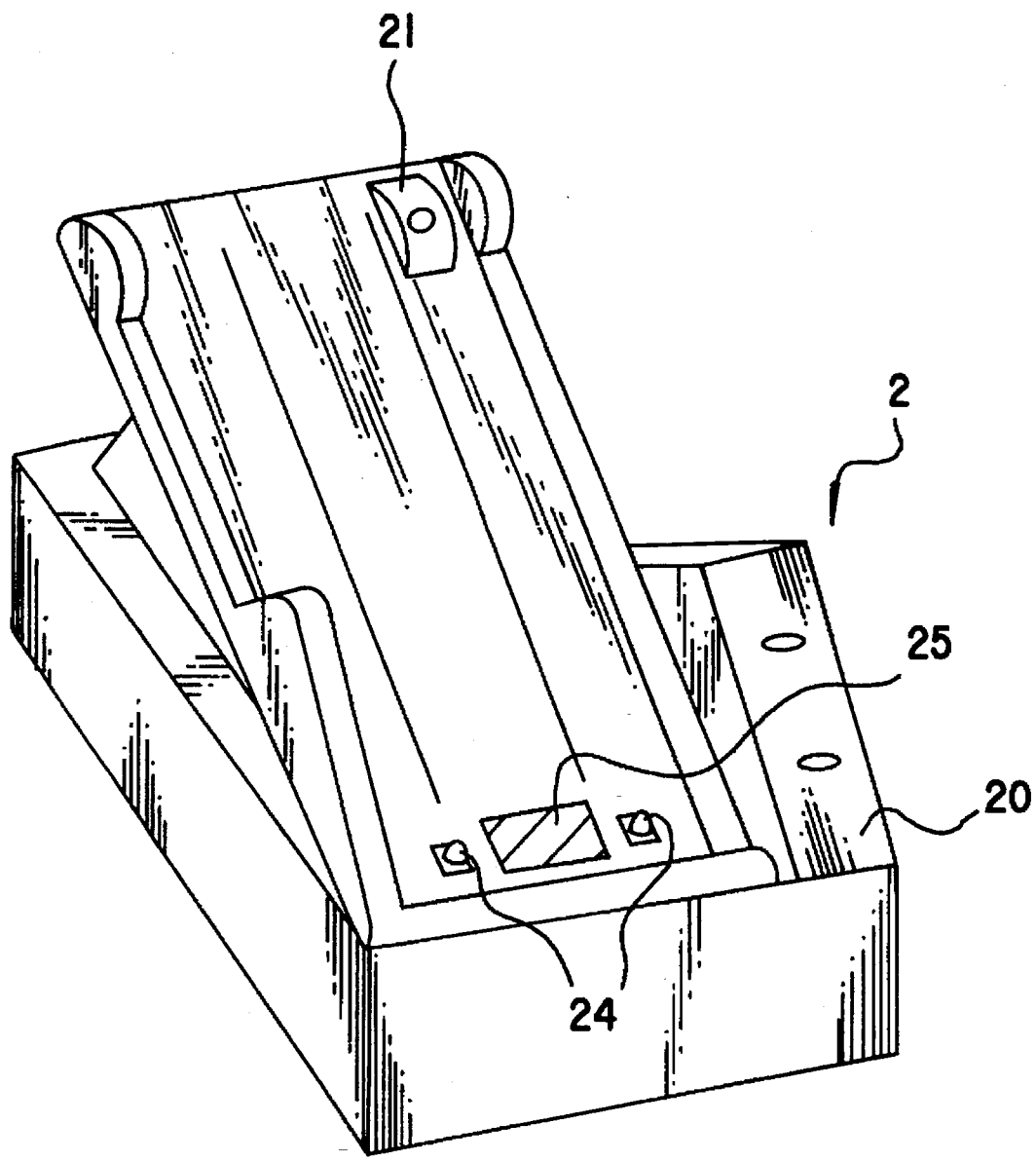
FIG. 8 is a diagram illustrating a front view of a transmission adapter according to the present invention.

FIG. 8 is a perspective view illustrating a front face of a transmission adapter 2 according to the present invention. In FIG. 8, numeral 20 denotes a casing of the transmission adapter 2, 21 denotes an ON/OFF switch, 24 denotes electrical connectors for supplying power to the hand-held terminal 1 to operate the hand-held terminal or charge a battery, and 25 denotes an optical connector for transmitting data. The ON/OFF switch 21 is turned ON when the hand-held terminal 1 is placed on the transmission adapter 2.

The first embodiment of the present invention will now be explained with reference to FIGS. 9A to 11A.

Figure 9A:
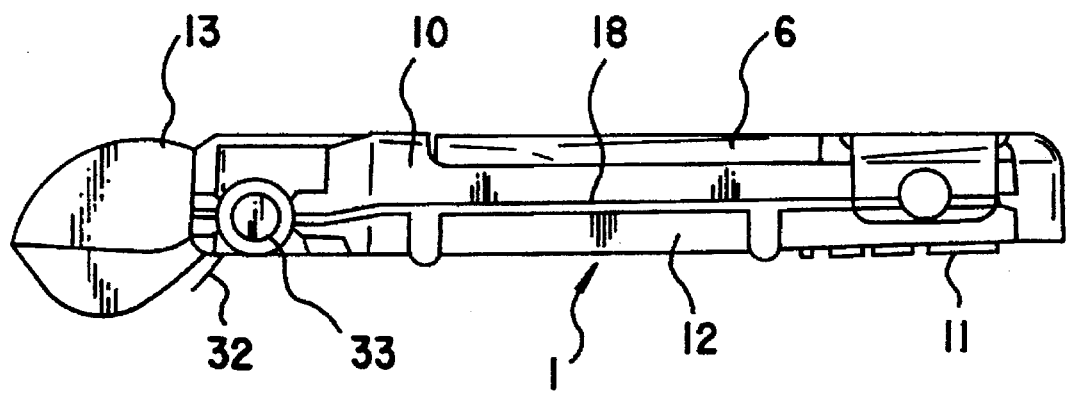
FIG. 9A is a diagram showing a side view of the hand-held terminal laid upside down, according to the first embodiment of the present invention.
Figure 9B:
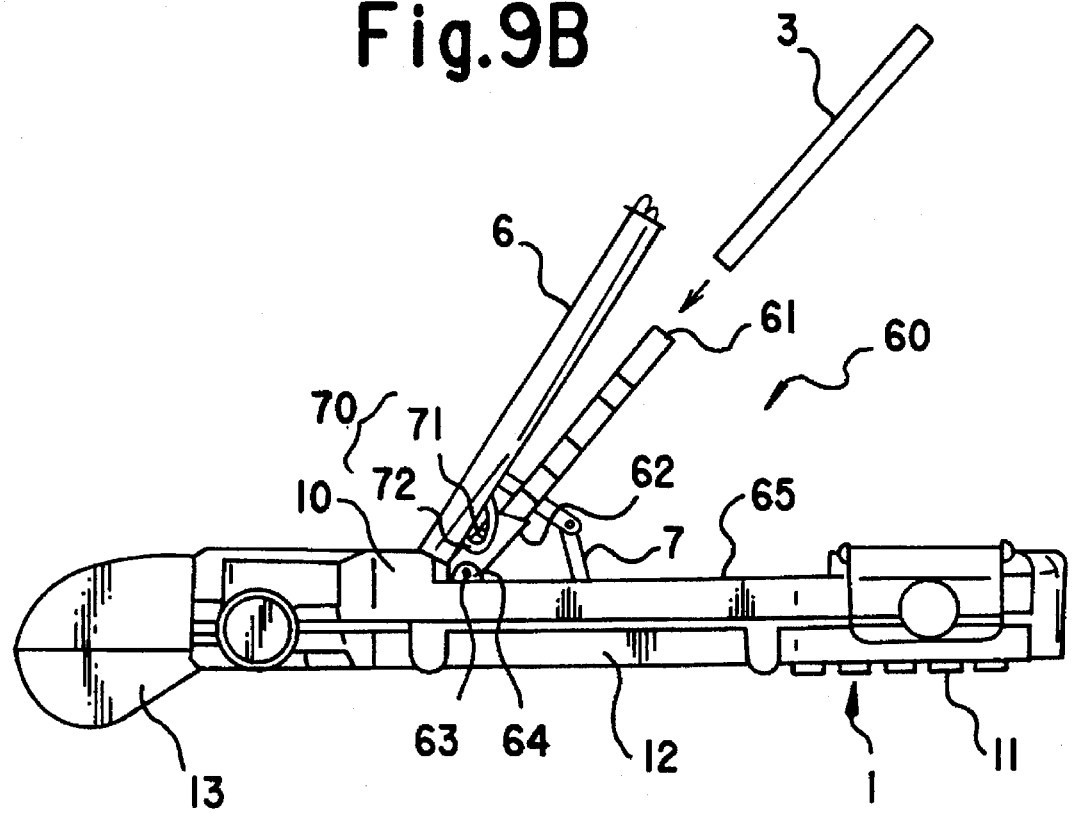
FIG. 9B is a diagram showing a side view of the the hand-held terminal laid upside down with the lid of a memory card portion being opened, according to the first embodiment of the present invention.

FIG. 9A shows a side view of the hand-held terminal 1 laid upside down with a lid being closed and FIG. 9B shows the same with the lid view of the the hand-held terminal laid upside down with the lid being opened.

In FIGS. 9A and 9B, numerals 1 denotes the hand-held terminal 1, 6 denotes a lid provided on the back face of casing 10 of the hand-held terminal 1, 7 denotes a foldable link for smoothing the opening and closing movement of the lid 6, 11 denotes the keyboard, 12 denotes the display unit comprised of a liquid crystal display, 13 denotes a printer, 18 denotes the moisture resistant seal, 19 denotes the main connector for communicating with the host computer and covered with an extended part of the moisture resistant seal 18, 32 is a sheet of paper delivered from the printer 13, and 33 is a finger grip of the printer 13, and 60 denotes a memory card holding mechanism covered by the lid 6.

The memory card holding mechanism 60 includes a connector guide 61 for guiding a memory card 3, a connector holder 62, an axle 63 projected on the base part of the connector holder 62, and a bracket 64 provided in a recess 65 of the casing 10 for supporting the axle 63 pivotably. Note that, a connector for connecting the memory card 3 is provided at the bottom of the connector holder 62 and it cannot be seen from the outside.

The memory card holding mechanism 60 is engaged with the lid 6 by an interlocking mechanism 70. The interlocking mechanism 70 is comprised of a pin 71 provided at the side face of the connector holder 62 and an annular bracket 72 for engaging the pin 71.

The detailed structure of the memory card holding mechanism 60 will be explained next with reference to FIGS. 10A and 10B.

Figure 10A:
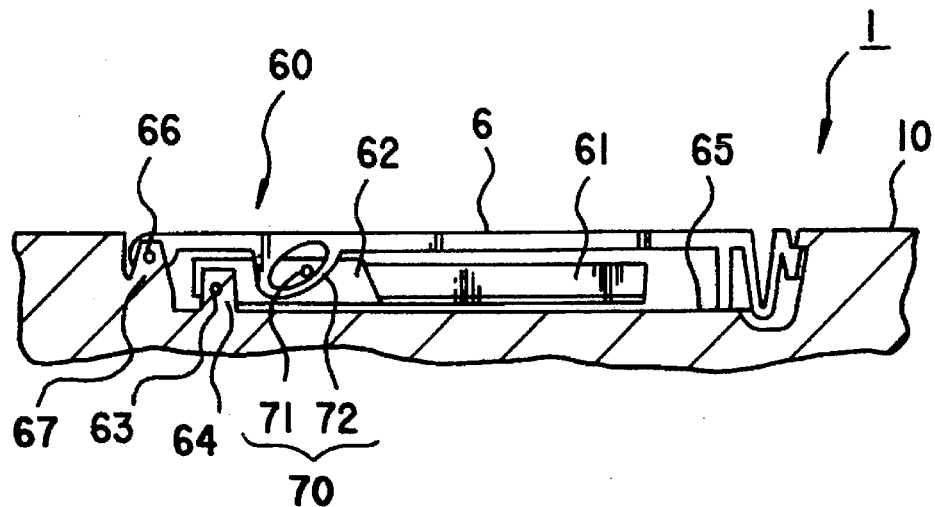
FIG. 10A is an enlarged sectional view showing a memory card installing mechanism of the hand-held terminal when the lid is closed, according to the first embodiment of the present invention.
Figure 10B:
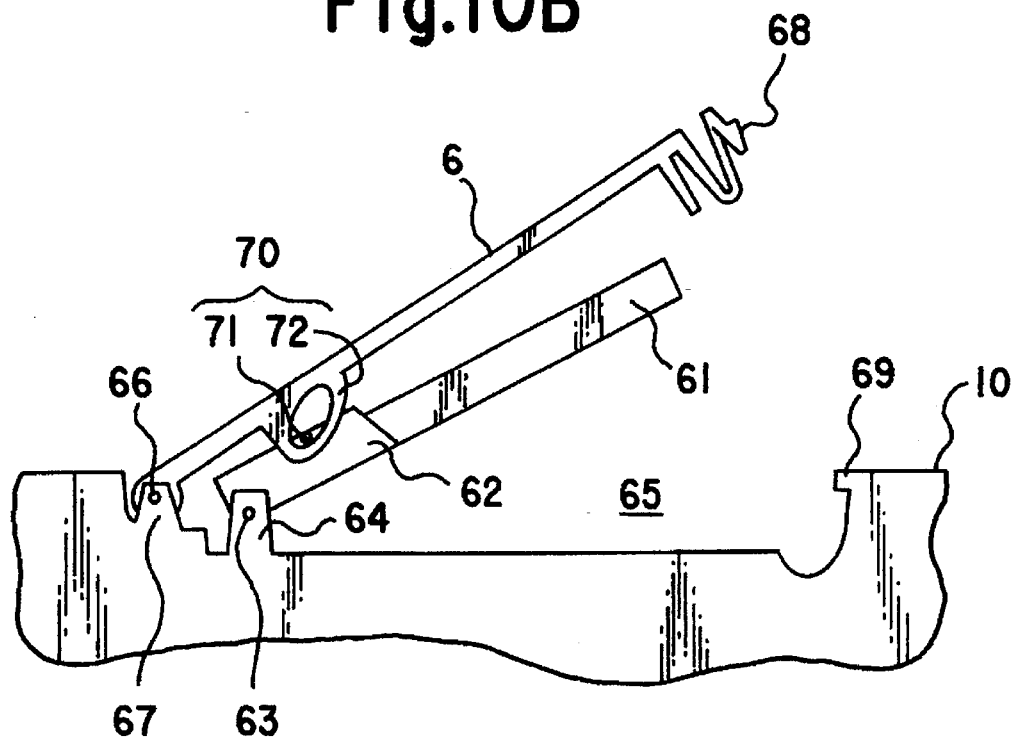
FIG. 10B is an enlarged sectional view showing a memory card installing mechanism of the hand-held terminal when the lid is opened, according to the first embodiment of the present invention.

FIG. 10A is an enlarged sectional view showing a memory card holding mechanism 60 of the hand-held terminal 1 when the lid 6 is closed, and FIG. 10B shows the same when the lid 6 is opened.

The lid 6 is disposed in the central part of the back of the casing 10 of the portable terminal unit 1. One end of the lid 6 has claws 68 which engaged with catches 69 of the casing 10. The catches 69 receives and locks the claws 68 when the lid 6 is closed. An axle 66 is provided at the other end of the lid 6, and is rotatably supported by a bracket 67 provided in the recess 65 of the casing 10. To open the lid 6, the claws 68 are detached from the catches 69, and the lid 6 is lifted upwardly. The lid 6 pivots on the axle 66. To fix the lid 6 to the casing 10, the lid 6 is pushed down so that the claws 68 engage with the catches 69.

When the lid 6 is closed, the outer surface of the lid 6 is flush with the back of the hand-held terminal 1. When the lid 6 is opened as shown in FIG. 10B, the connector holder 62 and the connector guide 61 attached to the end of the connector holder 62, are brought into view. The connector holder 62 incorporates a connector (not shown) to which a memory card is connected. When the memory card is loaded into the hand-held terminal 1, the connector guide 61 guides the memory card to the connector.

An end of the connector holder 62 has the axle 63, which engages with the bracket 64. Namely, the connector holder 62 is supported by the casing 10 of the hand-held terminal 1 and rotatable around the axle 63.

The connector holder 62 has pins 71 on both sides, which engage with annular bracket 72 formed on the lid 6. When the lid 6 is opened, the pins 71 are pulled up by the annular bracket 72. When the lid 6 is closed, the pins 71 are pushed down by the annular bracket 72. Accordingly, the connector holder 62 moves up and down according to the opening and closing of the lid 6.

The angle of opening of the connector holder 62 is smaller than that of the lid 6. When the lid 6 is fully opened as shown in FIG. 10B, the connector holder 62 is positioned between the casing 10 of the hand-held terminal 1 and the lid 6. Accordingly, the memory card is easily loaded into and removed from the hand-held terminal 1 because the casing 10 and the lid 6 do not block the memory card.

Figure 11A:
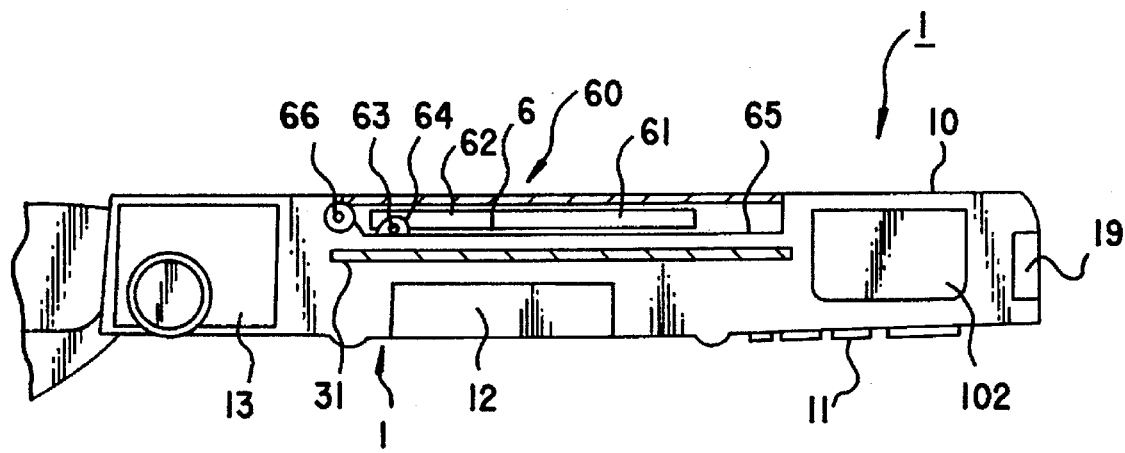
FIG. 11A is a sectional side view showing an internal constitution of the hand-held terminal laid upside down, according to the first embodiment of the present invention.

FIG. 11A is a sectional side view showing part of the internal constitution of the hand-held terminal 1 laid upside down. In FIG. 11A, numeral 6 denotes the lid, 11 denotes the keyboard, 12 denotes the liquid crystal display unit, 13 denotes the printer, 19 denotes the main connector, 31 denotes a printed circuit board, 60 denotes the memory card holding mechanism including the connector guide 61, the connector holder 62, the axle 63, and the bracket 64, 65 denotes the recess of the casing of the hand-held terminal 1, 66 denotes the axle of the lid 6, and 102 denotes a battery.

A shown in FIG. 11A, the battery 102 is thick and occupies most of the lower part of the hand-held terminal 1. The main connector 19 is arranged at the bottom of the hand-held terminal 1. The printer 13 is arranged at the top of the hand-held terminal 1. The printer 13 is also thick and occupies most of the upper part of the hand-held terminal 1. Accordingly, the upper and lower parts of the hand-held terminal 1 have no space to receive the memory card. The thickness of the hand-held terminal 1 is determined by the printer 13 and battery 102. The hand-held terminal 1 has some free space where the printer 13, etc., are not installed.

The display unit 12 and printed circuit board 31 are arranged at the center of the hand-held terminal 1, since these components are thinner than the printer 13 and the battery 102.

Even when the lid 6 is closed, there is a space between the lid 6 and the bottom of the recess 65 of the casing 10 of the hand-held terminal 1. In this space, the embodiment disposes the connector holder 62. Since this embodiment utilizes space that is usually dead space, to accommodate the memory card, the width or the thickness of the hand-held terminal 1 is not increased for the memory card.

As shown in FIG. 11A, the axle 66 of the lid 6 is shifted from the axle 63 of the connector holder 62.

Figure 11B:
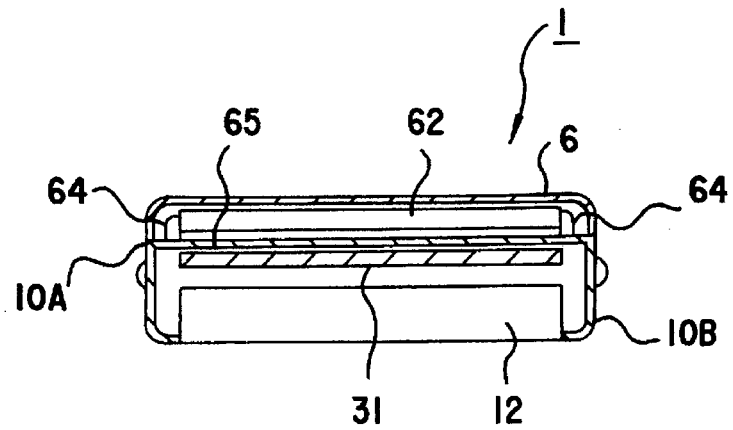
FIG. 11B is a sectional top view showing an internal constitution of the hand-held terminal laid upside down, according to the first embodiment of the present invention.

FIG. 11B is a sectional top view showing an internal constitution of the hand-held terminal 1 laid upside down. In FIG. 11B, numeral 6 denotes the lid, 10A denotes the upper casing, 10B denotes the lower casing, 12 denotes the display unit, 31 denotes the printed circuit board, 62 denotes the connector holder, 64 denotes the bracket, and 65 denotes the recess of the upper casing 10A of the hand-held terminal 1. The lid 6 has a channel like cross-sectional shape. The connector holder 62 is well accommodated in a space between the kid 6 and the bottom of the recess 65 of the upper casing 10A.

Although the first embodiment has been explained in connection with the hand-held terminal 1, the memory card holding mechanism of this embodiment is also applicable to loading a memory card into other electronic apparatuses, such as a word processor, an electronic note book and so on.

As explained above, according to the memory card holding mechanism 60 of the first embodiment, the thickness or width of the apparatus is decreased, thereby reducing the size of the apparatus. Further, the memory card 3 is completely accommodated in the apparatus and covered with the lid 6 of the apparatus. Accordingly, the memory card 3 will not protrude from the apparatus nor accidentally drop from the apparatus during use.

Furthermore, since the opening angle of a connector holder 62 is smaller than that of the lid 6 when the lid 6 is opened in the first embodiment, the memory card 3 is easily loaded into the apparatus.

Figure 12:
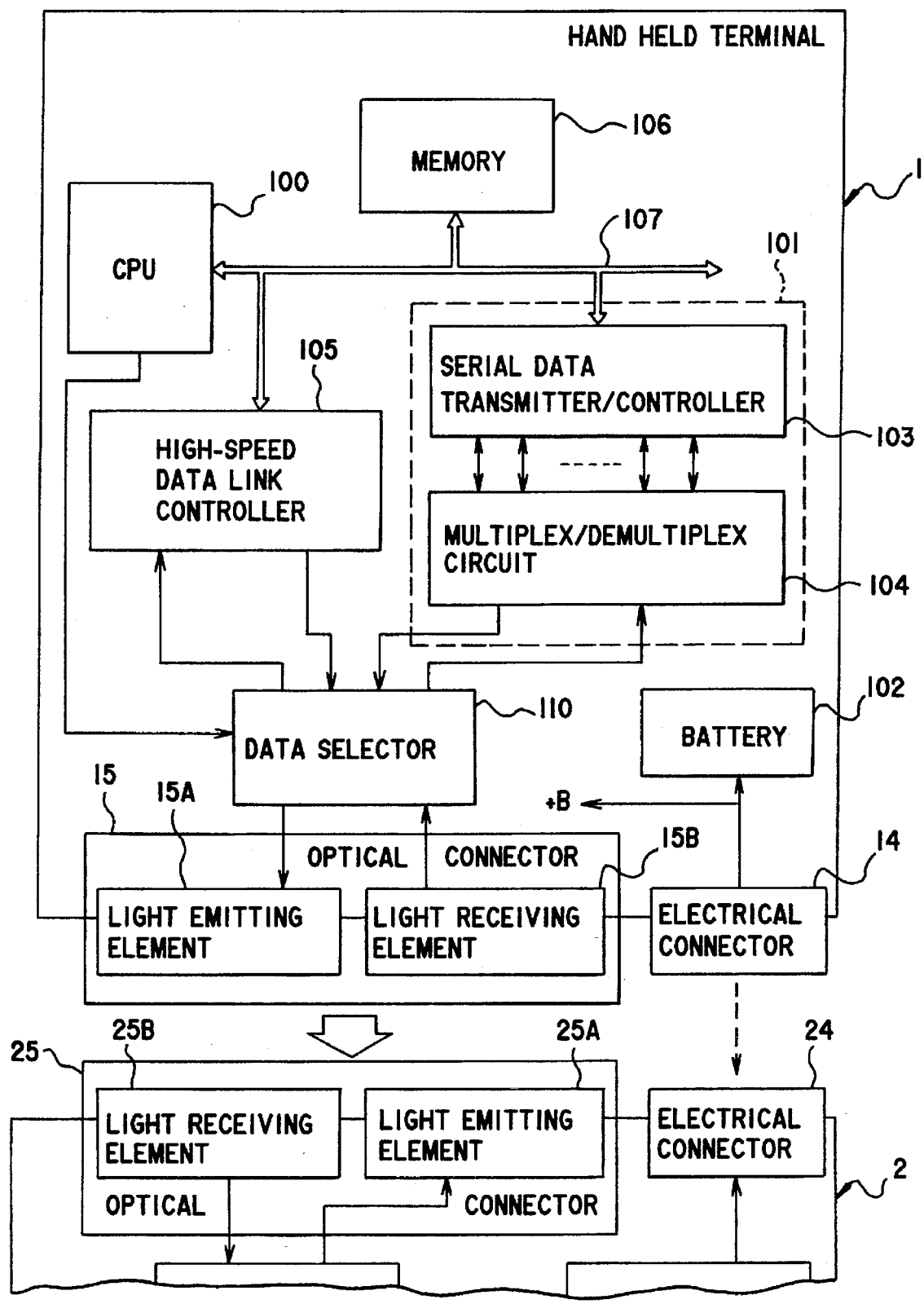
FIG. 12 is a block diagram showing an internal constitution of the hand-held terminal according to the second embodiment of the present invention.

FIG. 12 is a block diagram showing an internal constitution of the hand-held terminal 1 according to the second embodiment of the present invention. The hand-held terminal 1 is equipped with an electrical connector 14 to be connected to an electrical connector 24 of the data transmitting adapter 2, an optical connector 15 having a light emitting element 15A and a light receiving element 15B to be connected to an optical connector 25 having a light emitting element 25A and a light receiving element 25B of the data transmitting adapter 2.

Inside the hand-held terminal 1, there is provided the CPU 100, an RS232C interface circuit 101 having a serial data transmitter/controller 103 and a multiplex/demultiplex circuit 104, a battery 102, a high-speed data link controller 105, a memory 106, a bus 107, and a data selector 110. The bus 107 connects the CPU 100, the RS232C interface circuit 101, the high-speed data link controller 105 and the memory 106 together. One of the RS232C interface circuit 101 and the high-speed data link controller 105 is selectively connected to the optical connector 15 through the data selector 110. The battery 102 provides power to the circuits and is connected to the electrical connector 14 for charging.

When the data is input to the optical connector 15 from the RS232C interface circuit 101 or the high-speed data link controller 105 through the data selector 110, the data is transmitted by the light emitting element 15A to the light receiving element 25B of the data communication adapter 2. Conversely, the light receiving element 15B receives the data from the light emitting element 25A of the data communication adapter 2.

Figure 13:
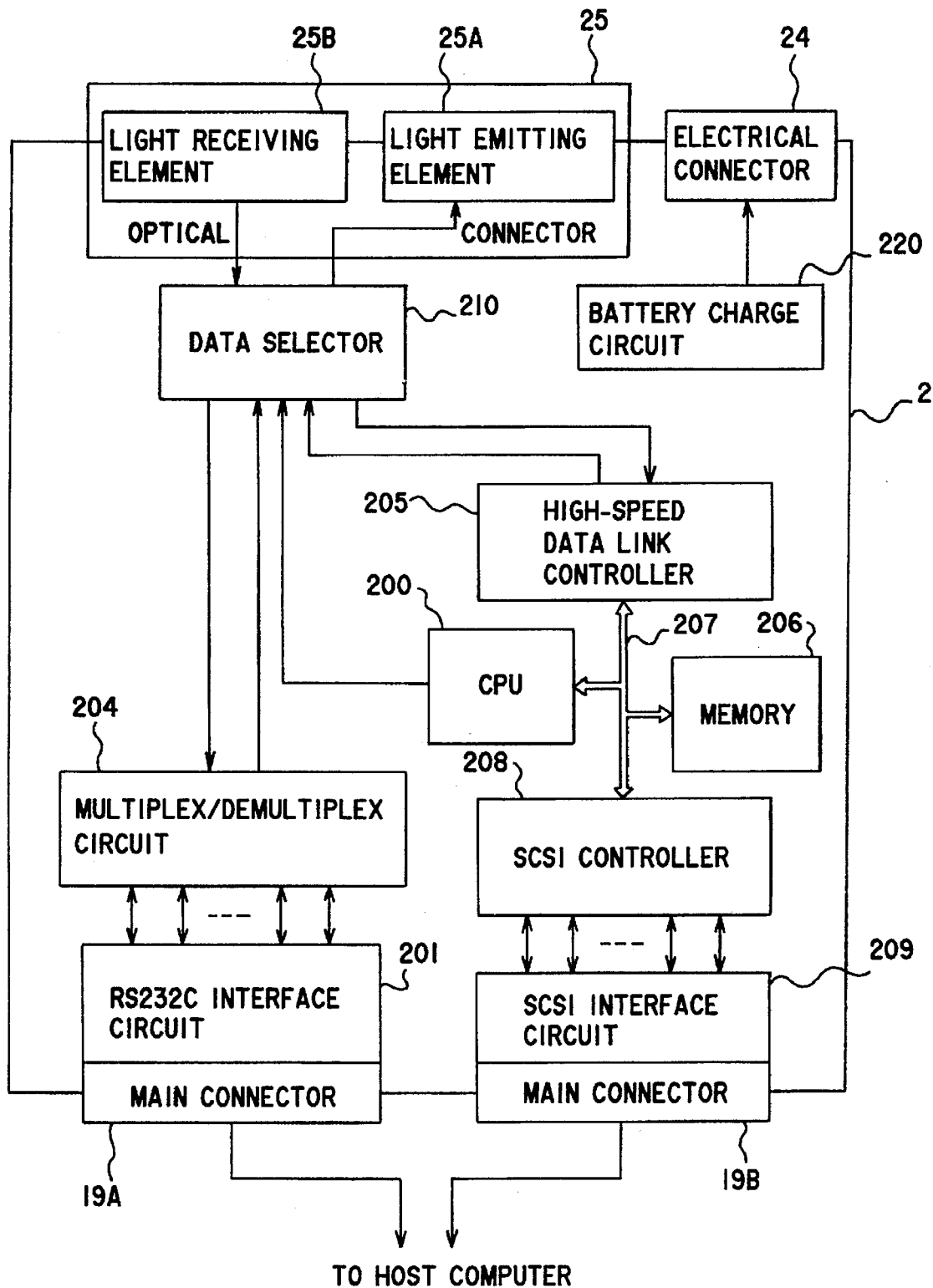
FIG. 13 is a block diagram showing an internal constitution of the transmission adapter according to the second embodiment of the present invention.

FIG. 13 is a block diagram showing an internal constitution of the data transmission adapter 2 according to the second embodiment of the present invention. The data transmission adapter 2 lies between the hand-held terminal 1 and a host computer (not shown) to transmit data between the hand-held terminal 1 and the host computer. The data transmitting adapter 2 is equipped with main connectors 19A and 19B, an electrical connector 24 to be connected to the electrical connector 14 of the hand-held terminal 1, an optical connector 25 having a light emitting element 25A and a light receiving element 25B to be connected to the optical connector 15 having the light emitting element 15A and the light receiving element 15B of the hand-held terminal 1.

Inside the data transmitting adapter 2, there is provided the CPU 200, an RS232C interface circuit 201, a a multiplex/demultiplex circuit 204, a high-speed data link controller 205, a memory 206, a bus 207, SCSI controller 208, a data selector 210, and a battery charge circuit 220. The bus 207 connects a CPU 200, the high-speed data link controller 205, the memory 206, and the SCSI controller 208 mutually. One of the RS232C interface circuit 201 and the high-speed data link controller 205 is selectively connected to the optical connector 25 through the data selector 210.

The multiplex-demultiplex circuits 104 and 204 are used for data transmission through the RS232C interface. These circuits 104 and 204 multiplex RS232C signals for an external apparatus and demultiplex multiplexed RS232C signals. The serial data transmitter/controller 103 converts parallel data from the CPU 100 into serial data, adds a parity bit and start and stop bits to the serial data, and sends the resultant data. The serial data transmitter/controller 103 receives serial data, converts them into parallel data, and transfers the parallel data to the CPU 100.

The high-speed data link controllers 105 and 205, and SCSI controller 208 are high-speed interfaces. The high-speed data link controllers 105 and 205 fetch data out of a memory 106 and 206 according to a DMA method, converts the data into serial data, and sends the serial data. The high-speed data link controller 105 and 205 receive serial data, converts them into parallel data, and stores the parallel data in the memory 106 and 206 according to the DMA method.

The SCSI interface circuit 209 is a parallel interface capable of transferring a large quantity of data at high speed. To transfer data at high speed, the interface the SCSI interface circuit 209 is used instead of the RS232C interface circuit 201.

The transmission adapter 2 has the two connectors 19A and 19B each to be connected to an apparatus having a corresponding interface. The connector 19A is for the RS232C interface circuit 210, and the connector 19B is for the SCSI interface circuit 209.

The data selectors 110 and 210 select one of the RS232C interface signal and SCSI interface signal. The operation of the data selector 110 is controlled by the CPU 100, and the operation of the data selector 210 is controlled by the CPU 200.

One of the interfaces of the transmission adapter 2 is selected according to the host computer connected to the adapter 2. A user can control the data selector 210 to select a required one of the RS232C and SCSI interfaces by a switch (not shown). The data selector 210 is switched accordingly, to transmit data through the selected interface.

In the hand-held computer 1, the CPU 100 provides a signal to the data selector 110 to select one of the interfaces. A user may select one of the interfaces by inserting an instruction through the keyboard of the hand-held terminal 1. The data selector 110 is switched accordingly, to transmit data through the selected interface.

The two interfaces share the light emitting elements 15A and 25A and receiving elements 15B and 25B, and the high-speed interface 105 is provided for the hand-held terminal 1 in addition to the conventional interface 101 without spoiling the compactness and light weight of the hand-held terminal 1.

Figure 14:
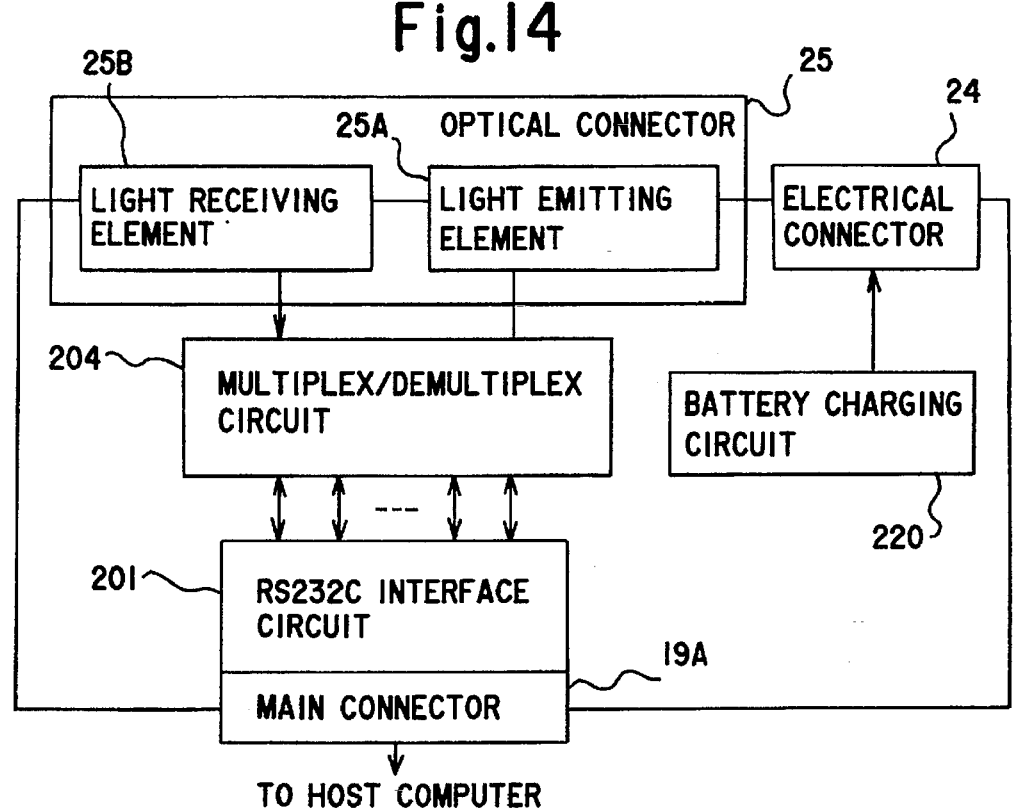
FIG. 14 is a block diagram showing another internal constitution of the transmission adapter according to the second embodiment of the present invention.

FIG. 14 is a block diagram showing the internal constitution of the transmission adaptor 2 according to the second embodiment of the present invention. In the embodiment shown in FIG. 14, only the RS232C interface circuit 201 and the main connector 19A are provided and the SCSI interface circuit 209 and the main connector 19B are omitted.

Figure 15:
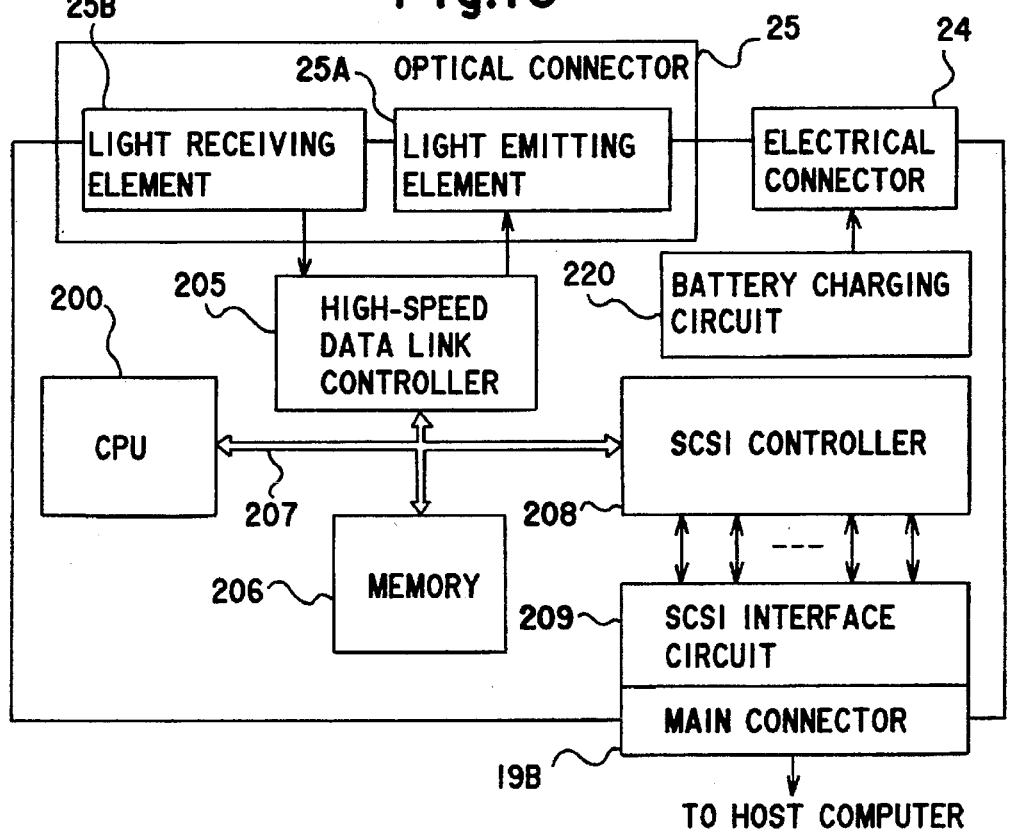
FIG. 15 is a block diagram showing another constitution of the transmission adapter according to the second embodiment of the present invention.

FIG. 15 is a block diagram showing another constitution of the transmission adapter 2 according to the second embodiment of the present invention. In the embodiment shown in FIG. 15, only the SCSI interface circuit 209 and the main connector 19B are provided and the RS232C interface circuit 201 and the main connector 19A are omitted.

As explained above, this embodiment adds a high-speed interface to the hand-held terminal without spoiling the compactness and light weight of the apparatus.

Figure 16:
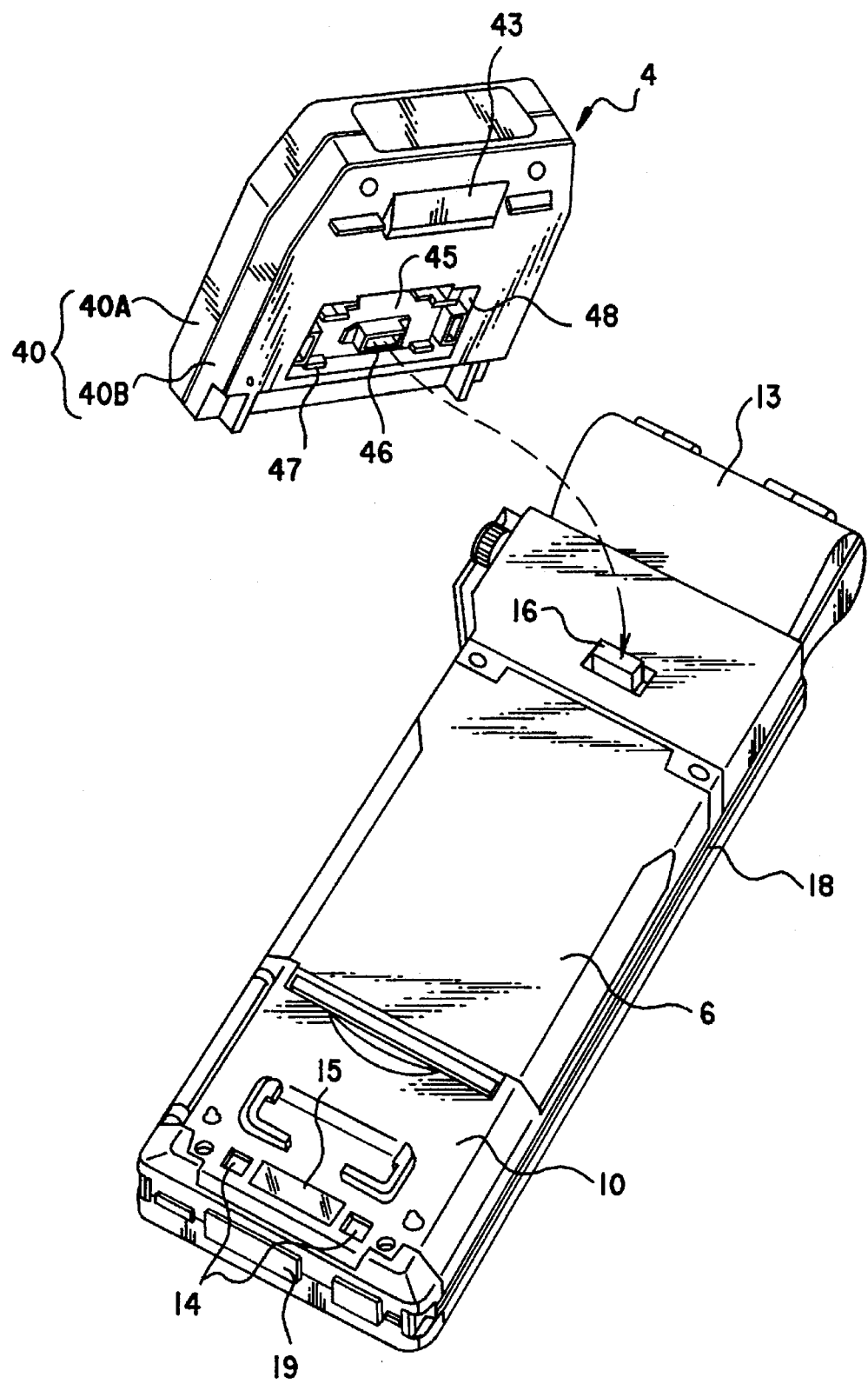
FIG. 16 is a diagram illustrating a connection between the hand-held terminal and an external optional device according to the third embodiment of the present invention.

FIG. 16 is a diagram illustrating a connection between the hand-held terminal 1 and an external optional device according to the third embodiment of the present invention.

The external optional device 4 may be a magnetic card reader or a bar-code reader. The external optional device 4 of FIG. 16 is attached to the hand-held terminal 1. The external optional device 4 provides the hand-held terminal 1 with an additional function that is not originally provided.

As explained in FIG. 7, the hand-held terminal 1 has the lid 6, the casing 10, the printer 13, the electrical connectors 14 for receiving power, the optical connector 15 for transmitting data, the auxiliary connector 16 for connecting an external optional device 4, the moisture resistant seal 18, and the main connector 19 for communicating with the host computer covered with a extended part of the moisture resistant seal 18.

Figure 17:
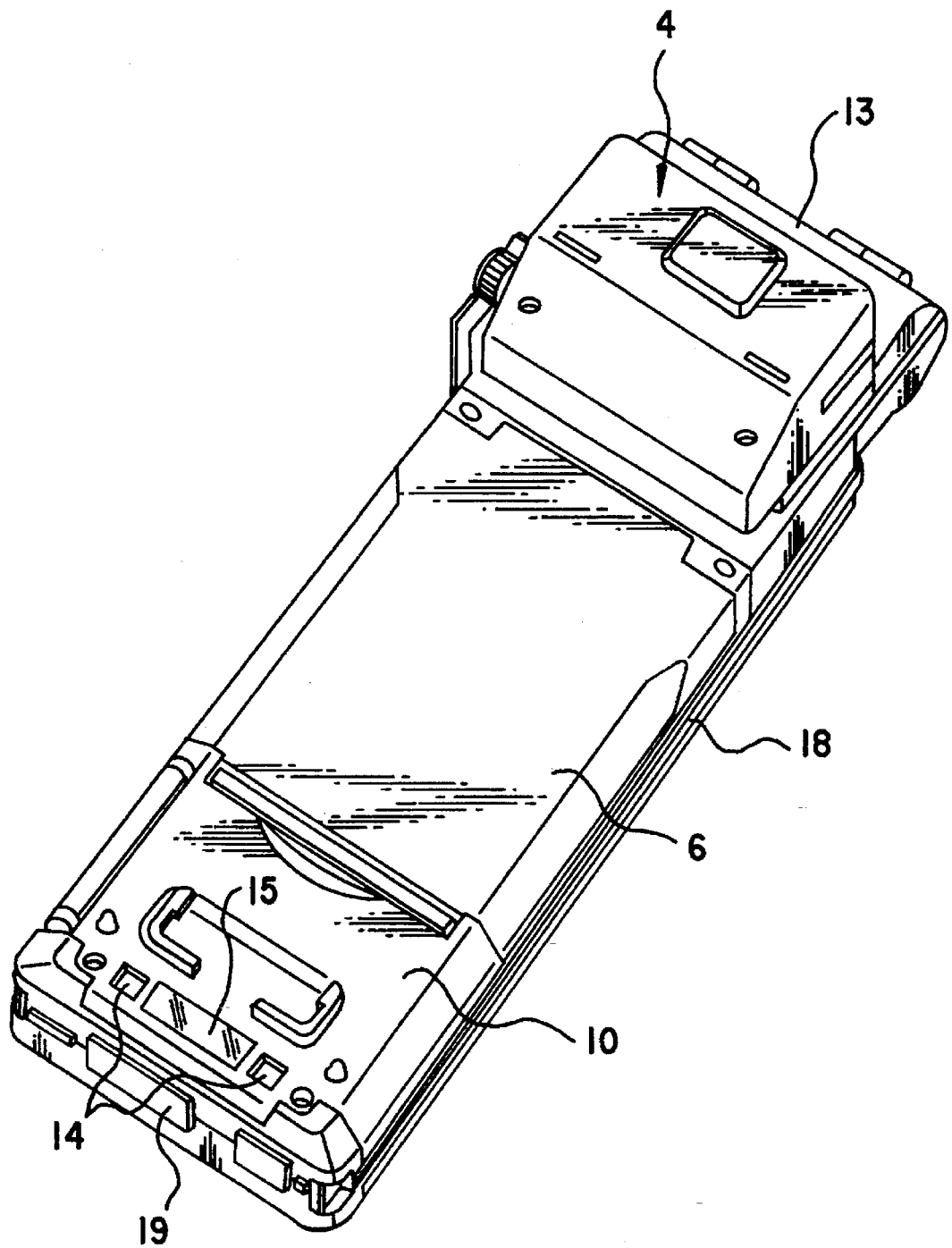
FIG. 17 is a diagram illustrating a perspective view of the external optional device attached to the hand-held terminal according to the third embodiment of the present invention.

In FIG. 17, the external optional device 4 is shown from the back. Numerals 40 denotes a casing comprised of an upper casing 10A and a lower casing 10B, 43 denotes a projection, 45 denotes a printed circuit board, 46 denotes a connector mounted on the printed circuit board 45, 47 denotes a claw, and 48 denotes an opening. The external optional device is attached on the back of the hand-held terminal 1 with its connector 46 engaged with the auxiliary connector 16 of the hand-held terminal 1 as shown in FIG. 17.

Figure 18:
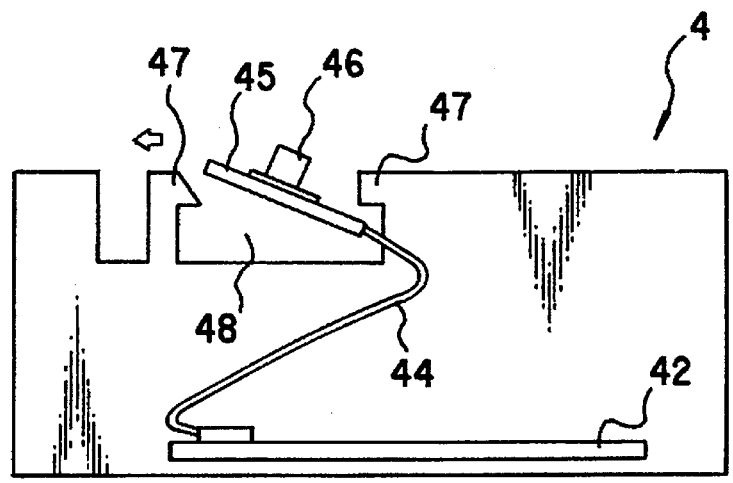
FIG. 18 is a sectional side view showing an external optional device according to the third embodiment of the present invention.

FIG. 18 is a sectional side view showing an internal construction of the external optional device 4. The printed circuit board 45 where the connector 46 is mounted is attached to an end of a flexible cable 44. The other end of the flexible cable 46 is connected to a main printed circuit board 42. The flexible cable 44 may be a flat cable. The flexible cable 46 is folded at two locations between the printed circuit board 45 and the main printed circuit board 42. The number of the folds is not limited to two.

The folded cable 46 pushes the printed circuit board 45 on which the connector 46 is attached upward with the elasticity of the cable. Accordingly, this embodiment uses no springs to push the connector 46. To strengthen the elasticity of the cable 46, the angle of bending at each fold of the cable 46 may be steepened. The connector 46 is accessible through the opening 48. Four claws 47 are formed along the opening 48 to suppress the four corners of the printed circuit board 45 to keep the printed circuit board 45 inside of the opening 48.

There is a space between the claws 47 and the bottom of the opening 48, to allow the connector 46 to move vertically. The horizontal and vertical size of the opening 48 is slightly larger than that of the size of the printed circuit board 45 on which the connector 46 is attached. Accordingly, the printed circuit board 45, namely, the connector 46 is slightly movable in left and right directions or up and down directions in the opening 48.

The the claws 47 positioned in the upper portion of the hand-held terminal 1 (left side in FIG. 18) have a tapered outside face. Accordingly, when the printed circuit board 45 is inserted into the opening 48, an end of the printed circuit board 45 is set under the claws 47 positioned in the lower portion of the hand-held terminal 1 (right side in FIG. 18) first. Then the other end of the printed circuit board 45 is pushed towards the tapered face of the upper claws 47. The other end of the printed circuit board 45 slides on the tapered face while bending the claws 47 outside and then the printed circuit board 45 is easily set under the claws 47.

Figure 19:
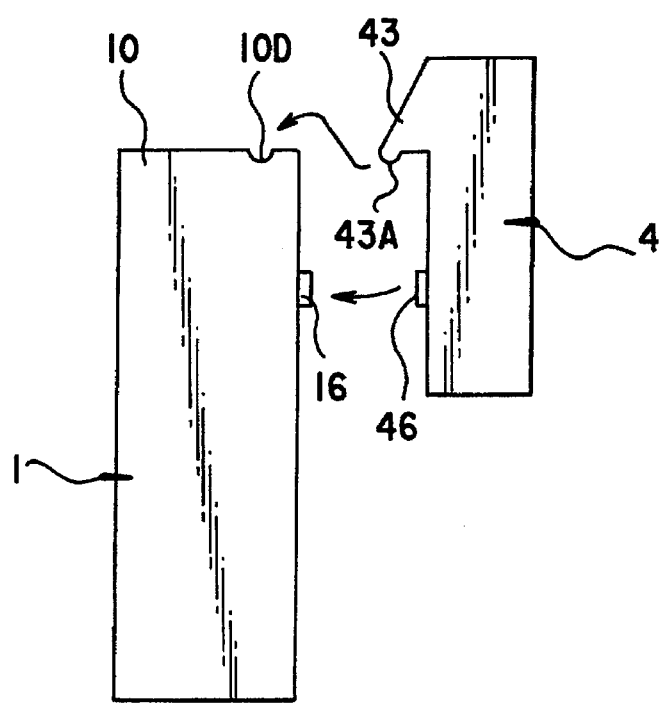
FIG. 19 is a diagram illustrating a connection between the external optional device and the hand-held terminal according to the third embodiment of the present invention.

FIG. 19 explains how the external optional device 4 is attached on the hand-held terminal 1. A claw 47A is formed on the free end of the projection 43 in this embodiment, and a recess 10D is formed on the top face of the casing 10 of the hand-held terminal 1. When the external device 4 is mounted on the hand-held terminal 1, the claw 43A of the projection 43 engages with the recess 10D first. This engagement roughly positions the external optional device 4 relative to the hand-held terminal 1. The external device 4 is moved with the claw 43A of the projection 43 and recess 10D serving as fulcrum, and the connector 16 of the hand-held terminal 1 is engaged with the connector 46 of the external device 4. The hand-held terminal 1 and the external optional device 4 are fixed to each other with screws (not shown).

The connector 46 is movable so that is moves depending on the position of the connector 16 of the hand-held terminal 1 when the connectors 16 and 46 are engaged with each other. Accordingly, a user can easily join the connectors 16 and 46 without paying attention to the positions of the connectors.

Even after the hand-held terminal 1 and external optional device 4 are fixed to each other with the screws, the connector 46 of the external device 4 is movable relative to the screws, so that no excessive load is applied to the connectors 16 and 46 even if the positions of the connector 16 of the hand-held terminal 1 and the connector 46 of the external device 4 deviate from each other.

In this way, this embodiment reduces labor and time in joining connectors together. Further, the structure of each connector 16 and 46 is simple, thereby reducing manufacturing processes, and causing no trouble even if the fitting position of a connector fluctuates in the manufacturing process.

Figure 20A:
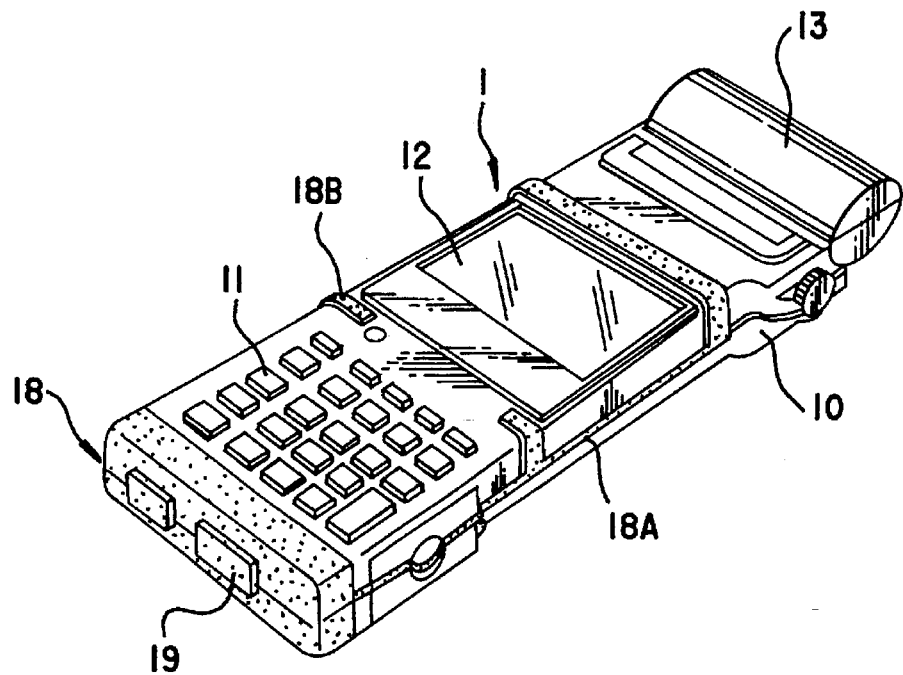
FIG. 20A is a diagram illustrating a front view of a hand-held terminal with a rubber seal according to the fourth embodiment of the present invention.
Figure 20B:
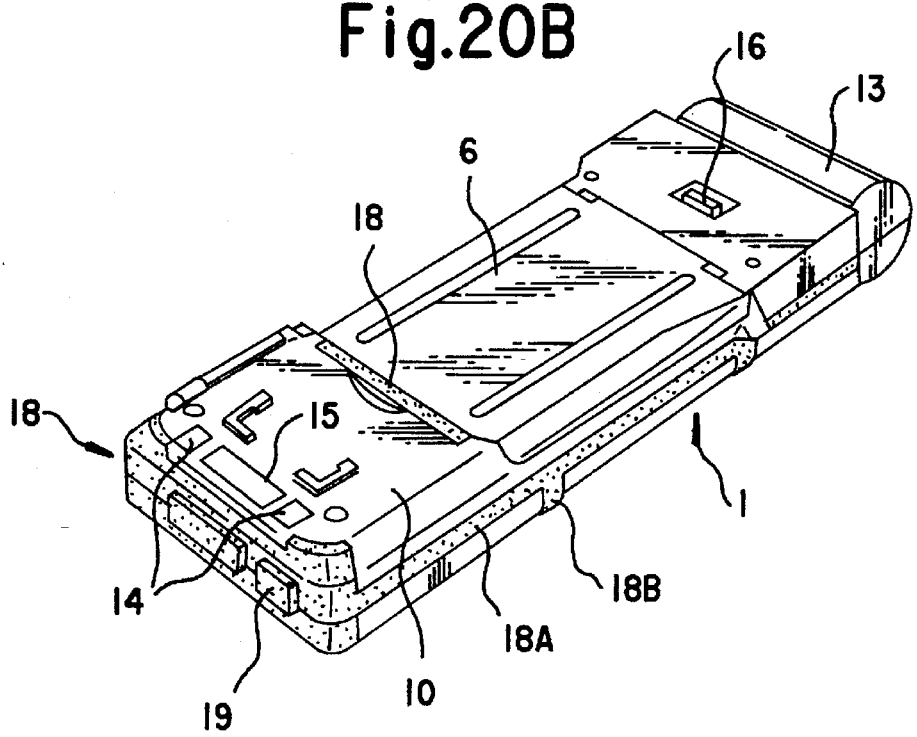
FIG. 20B is a diagram illustrating a bottom view of a hand-held terminal with a rubber seal according to the fourth embodiment of the present invention.

FIG. 20A is perspective view showing the hand-held terminal 1 with moisture resistant seal and FIG. 20B is a perspective bottom view of a hand-held terminal 1 with moisture resistant seal according to the fourth embodiment of the present invention.

In FIG. 20A and 20B, numeral 6 denotes a lid, 10 denotes a casing of the hand-held terminal 1, 11 denotes keyboard, 12 denotes a display unit comprised of a liquid crystal display, 13 denotes a printer, 14 denotes electrical connectors for receiving power to the hand-held terminal 1 to operate the hand-held terminal or charge a battery, 15 denotes an optical connector for transmitting data, 16 denotes an auxiliary connector for connecting an external optional device, 18 denotes a moisture resistant seal, and 19 denotes a main connector for communicating with the host computer, covered with an extended part of the moisture resistant seal 18.

In this embodiment, the moisture resistant seal 18 is made from rubber. It may be made from resin, in particular, soft resin. The moisture resistant cover 18 is arranged an openings and joints formed on a casing of the hand-held terminal 1. As shown in FIGS. 20A and 20B, the moisture resistant seal 18 is applied to a side face seal 18A, a screw hole seal 18B, and a bottom seal 18C of the hand-held terminal 1 including a connector cover 18D. In particular, the bottom portion of the hand-held terminal 1 is entirely covered with the bottom seal 18C of the moisture resistant seal 18.

Figure 21A:
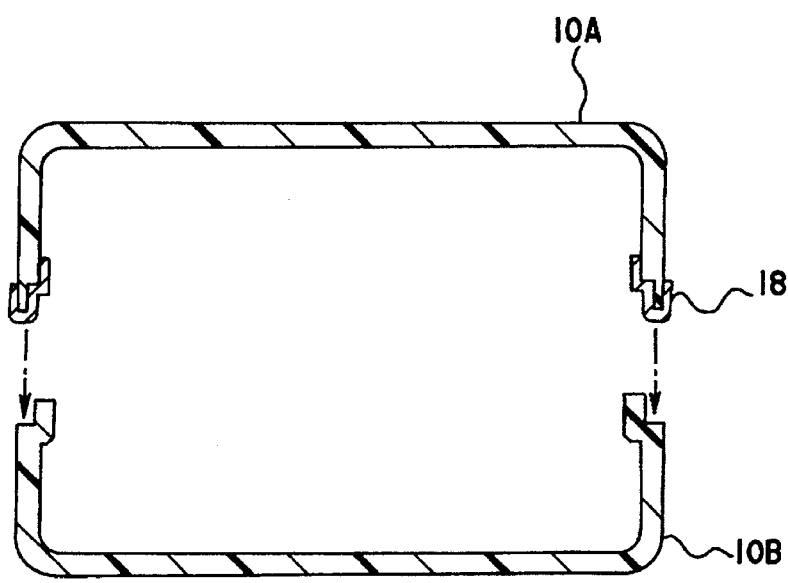
FIG. 21A is an exploded sectional view of the upper casing and the lower casing according to the fourth embodiment of the present invention.

The moisture resistant seal 18 according to this embodiment is integral with an upper casing 10A of the hand-held terminal 1. FIG. 21A is a sectional view showing the hand-held terminal 1. In this embodiment the moisture resistant seal 18 is made of a moisture resistant rubber sheet, and the moisture resistant seal 18 is formed integrally with the upper casing 10A, and the upper casing 10A is engaged with the lower casing 10B. The moisture resistant seal 18 fills a gap between the upper casing 10A and the lower casing 10B, to improve the moisture resistance of the hand-held terminal 1.

Figure 21B:
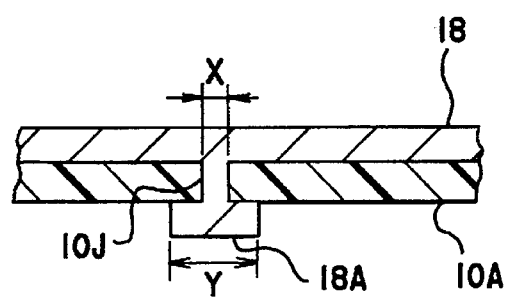
FIG. 21B is a enlarged partial sectional view showing the moisture resistant seal engaged with an upper casing of the hand-held terminal according to the fourth embodiment of the present invention.

FIG. 21B shows the moisture resistant seal 18 engaged with the upper casing 10A. The upper casing 10A is molded and the moisture resistant seal 18 is laid on the upper casing 10A.

Forming of the moisture resistant seal 18 on the upper cover 10A will be explained hereinafter. The upper casing 10A is firstly molded. The moisture resistant seal 18 made of rubber is formed on the upper casing 10A. The upper casing 10A has holes 10J arranged thereon. When rubber is applied to the upper casing 10A, the rubber enters the holes 10J. Accordingly, the moisture resistant seal 18 nearly completely adheres to the upper casing 10A. Due to rubber entered in the holes 10J, the moisture resistant seal 18 is strongly fixed to the upper casing 10A. Such a strong adhesion of the moisture resistant seal 18 is not achievable by the prior art. To prevent the moisture resistant seal 18 from peeling off, the width Y of the moisture resistant seal 18 projecting from the holes 10J is larger than the width X of the holes 10J, so that the notch part 18A will not escape from the hole 10J.

Figure 21C:
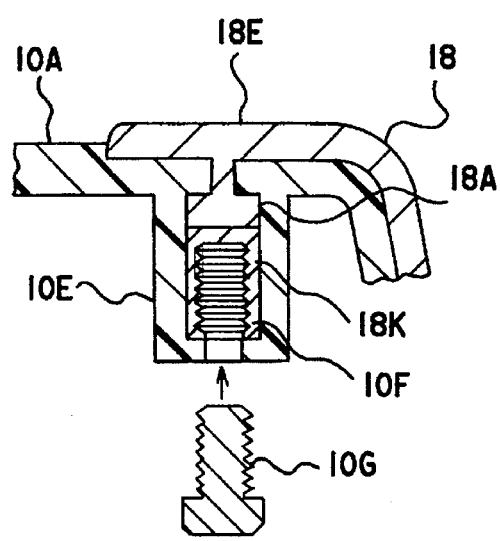
FIG. 21C is a enlarged partial sectional view showing the moisture resistant seal engaged with a screw hole of the upper casing of the hand-held terminal according to the fourth embodiment of the present invention.

The moisture resistant seal 18 is extended along the periphery of the apparatus as shown in FIG. 21C. In FIG. 21C, a hole 18K for an internally threaded insert 10F formed in a boss 10E projected on the upper casing 10A is partially filled with the rubber that forms the notch part 18A of the extended part of the moisture resistant seal 18. This arrangement more strongly attaches the moisture resistant seal 18 to the upper casing 10A and fills the end of the hole 18K to prevent the threaded insert 10F and a mating screw 10G from allowing moisture to enter the case.

The moisture resistant cover completely fills a gap between the upper casing 10A and the lower casing 10B, to improve the moisture resistant characteristics of the hand-held terminal 1.

Further, the moisture resistant seal 18 made from rubber is arranged where the lid 6 is in contact with the casing 10 of the hand-held terminal 1 as shown in FIG. 20B. The moisture resistant seal 18 fills a gap between the casing 10 and the lid 6, to prevent moisture from entering the hand-held terminal 1 from the back thereof. The a moisture resistant seal 18 is also arranged around an opening for a battery (not shown).

Figure 22:
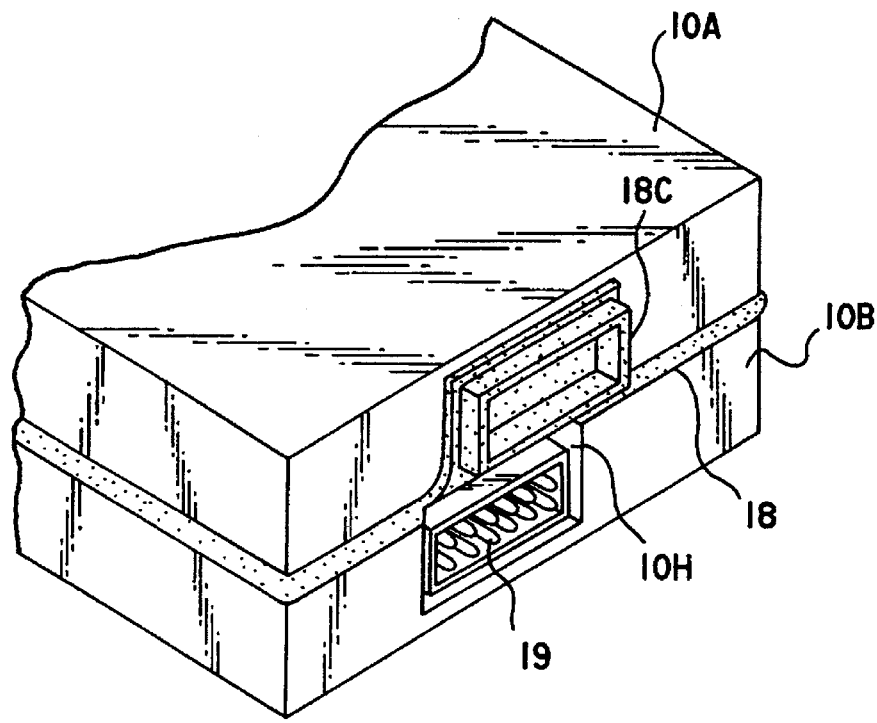
FIG. 22 is a diagram illustrating a connector cover formed together with a moisture resistant seal according to the fourth embodiment of the present invention.

FIG. 22 shows a connector cover 18C according to this embodiment, for covering the main connector 19 or a battery charging jack (not shown). The connector cover 18C is made from rubber and fitted to the connector 19 or the jack formed at lower part of the hand-held terminal 1.

In FIG. 22, the connector cover 18C is formed on a lower end of the hand-held terminal 1. The material of the connector cover 18C is the same as that of the moisture resistant seal 18 of the apparatus. The connector cover 18C is integral with the moisture resistant seal 18. The connector cover 18C can therefore never be unexpectedly dropped or lost.

Figure 23:
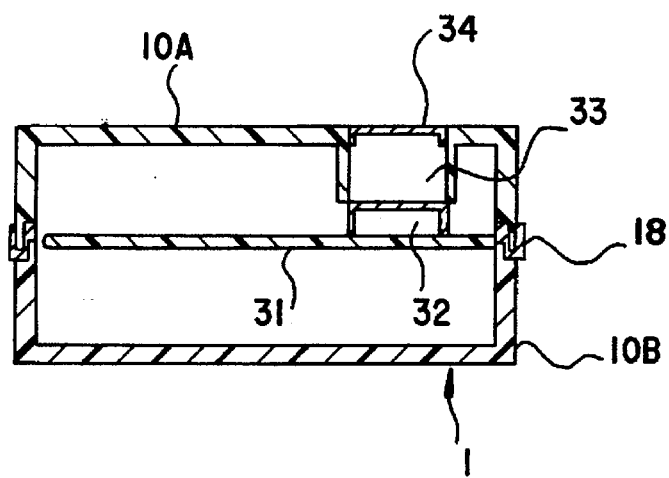
FIG. 23 is a cross-sectional view showing a buzzer area according to the fourth embodiment of the present invention.

FIG. 23 is a sectional view showing part of the hand-held terminal 1 where a buzzer 32 is arranged, according to an applied embodiment of the present invention. The buzzer 32 is fitted to a printed circuit board 31. The upper casing 10A has an opening 33 corresponding to the buzzer 32. The opening 33 is covered with a rubber seal 34 that is integral with the upper casing 10A. This seal 34 provides the buzzer 32 area with complete moisture resistant characteristics. The rubber seal 34 for the buzzer 32 is thinner than the other rubber seals 18. The thin seal 34 will not dampen the sound volume of the buzzer 32.

As explained above, by using to the moisture resistant seal 18 integral with the upper casing 10A, the hand-held terminal 1 is tightly sealed. Further, the moisture resistant seal 18 will not easily peel off, thereby improving the moisture resistant capability of the hand-held terminal.

Figure 24:
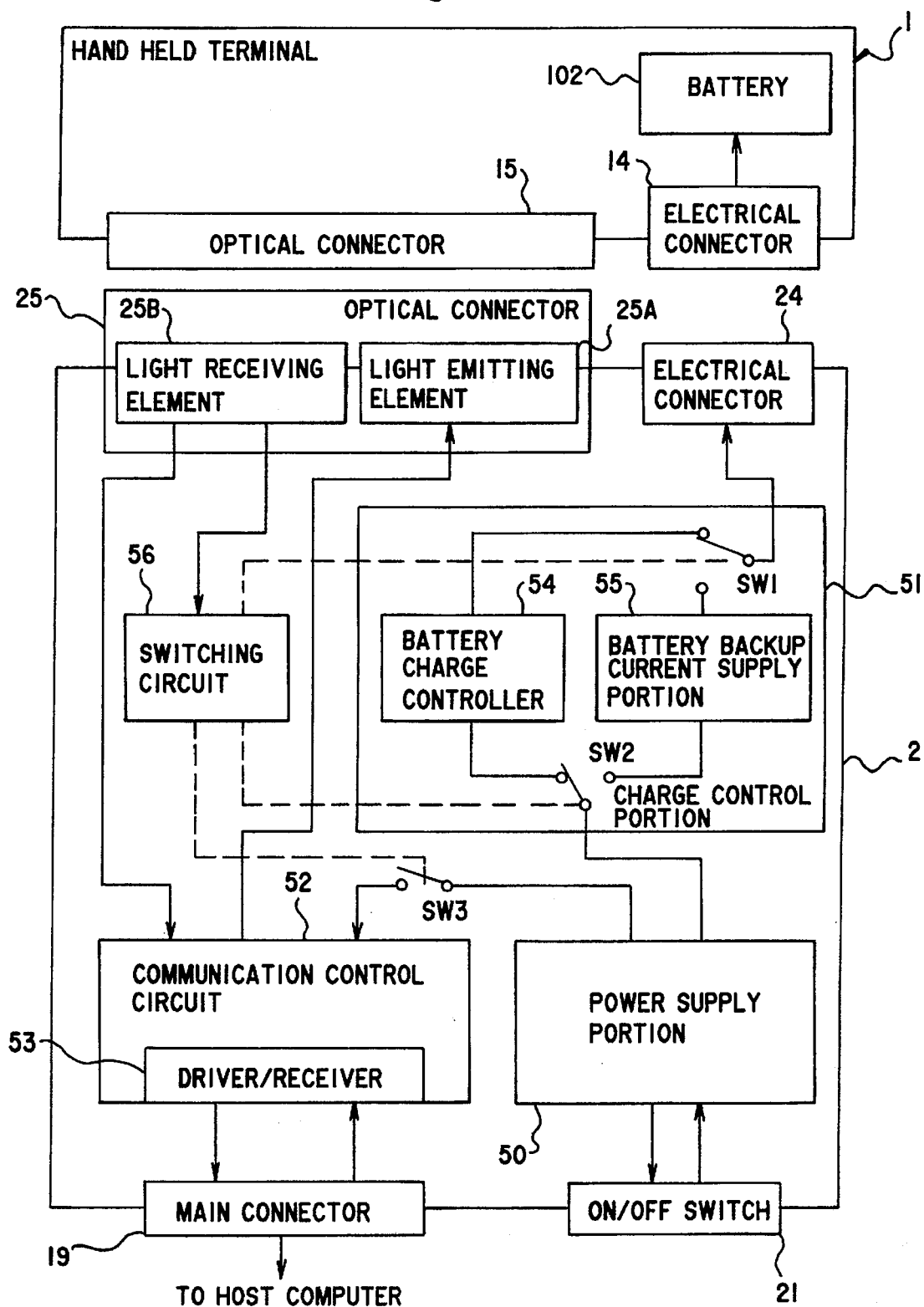
FIG. 24 is a block diagram showing an internal constitution of a charging circuit of the transmission adapter according to the fifth embodiment of the present invention.

FIG. 24 is a block diagram showing the internal constitution of the hand-held terminal 1 and the data transmission adapter 2 according to the fifth embodiment of the present invention.

In FIG. 24, numerals 14 and 24 denote the electrical connector, 15 denotes the optical connector, 19 denotes the main connector, 21 denotes the ON/OFF switch, 25 denotes the optical connector having the light emitting element 25A and the light receiving element 25G, 50 denotes the power supply portion, 51 denotes the charge control portion having a battery charge controller 54 and a battery backup current supply portion, 52 denotes the communication control circuit, 53 denotes a driver/receiver, 56 denotes a switching circuit and 102 denotes the battery. The battery 102 is supplies power to the hand-held terminal 1. The battery 102 may be rechargeable. In this case, the battery 102 is charged by the transmission adapter 2.

The communication controller 52 controls data communication between the hand-held terminal 1 and the host computer. The power supply portion 50 supplies power to the transmission adapter 2 and charges the battery 102 of the hand-held terminal 1. The battery charge controller 54 controls an operation of charging the battery 102 of the hand-held terminal. The backup current supply portion 55 supplies an auxiliary current to the hand-held terminal 1. The switching circuit 56 controls a switches SW1 and SW2 to switch the battery charge controller 54 and the battery backup current supply circuit 55 from one to another. The switching circuit 56 also controls a switch SW3 to switch the power supply portion 50 to the communication control circuit 52.

The power supply portion 50 provides an electric power source of, for example 8.4 V and 0.5 A. When the hand-held terminal 1 is connected to the transmission adapter 2, the switching circuit 56 controls the switches SW1 and SW2 to let the battery charge controller 54 supply a power of 8.4 V and 0.4 A to the battery 102 of the hand-held terminal 1, thereby charging the battery 102. When the battery 102 is fully charged, the transmission adapter 2 disconnects the battery charge controller 54 to stop charging the battery 102 and monitors the voltage of the battery 102.

If the voltage of the battery 102 decreases to, for example, 8.2 V, the switching circuit 56 connects the battery charge controller 54 to the hand-held terminal 1, to resume the charging operation of the battery 102. In this way, the voltage of the battery 102 is kept above 70% of its rated value while the hand-held terminal 1 is in connected with the transmission adapter 2. During the charging operation, no power is supplied to the communication control circuit 52.

Data from the hand-held terminal 1 and data from the host computer are also supplied to the switching circuit 56. When detecting transmission data from the hand-held terminal 1, the switching circuit 56 controls the switch SW3 to supply power to the communication control circuit 52. As a result, communication with the host computer through the driver-receiver 53 is enabled. At the same time, the switching circuit 56 disconnects the battery charge controller 54 from the hand-held terminal 1, to stop charging the battery 102 of the hand-held terminal 1.

If the voltage of the battery 102 drops, it will hinder data transmission from the hand-held terminal 1. Accordingly, if the voltage of the battery 102 drops, the switching circuit 56 controls the switches SW1 and SW2 of the charge control portion 51 to let the battery backup current supply portion 55 supply a power of, for example, 8.4 V and 0.2 A to the hand-held terminal 1 to maintain the data transmission from the hand-held terminal 1. The current may be minimum to continue the data transmission from the hand-held terminal 1. This current value is smaller than a current value needed for the charging operation, so that the power consumption of the transmission adapter 2 is smaller than continuing the charging operation.

The switching circuit 56 has a timer, which is activated when data communication between the host computer and the hand-held terminal 1 is stopped. If the timer shows that the communication stopped state between the host computer and the hand-held terminal 1 is continuous for a predetermined period, for example, one minute, the switching circuit 56 determines that the data communication between the host computer and the hand-held terminal 1 is complete and controls the switch SW3 to stop power to the communication control circuit 52. At the same time, the switching circuit 56 controls the switches SW1 and SW2 of the charge control circuit 51 to let the battery charge controller 54 resume the charging operation of the battery 102.

The operation of the transmission adapter 2 when it is connected to the hand-held terminal 1 will be explained next with reference to the flowchart of FIG. 25.

Figure 25:
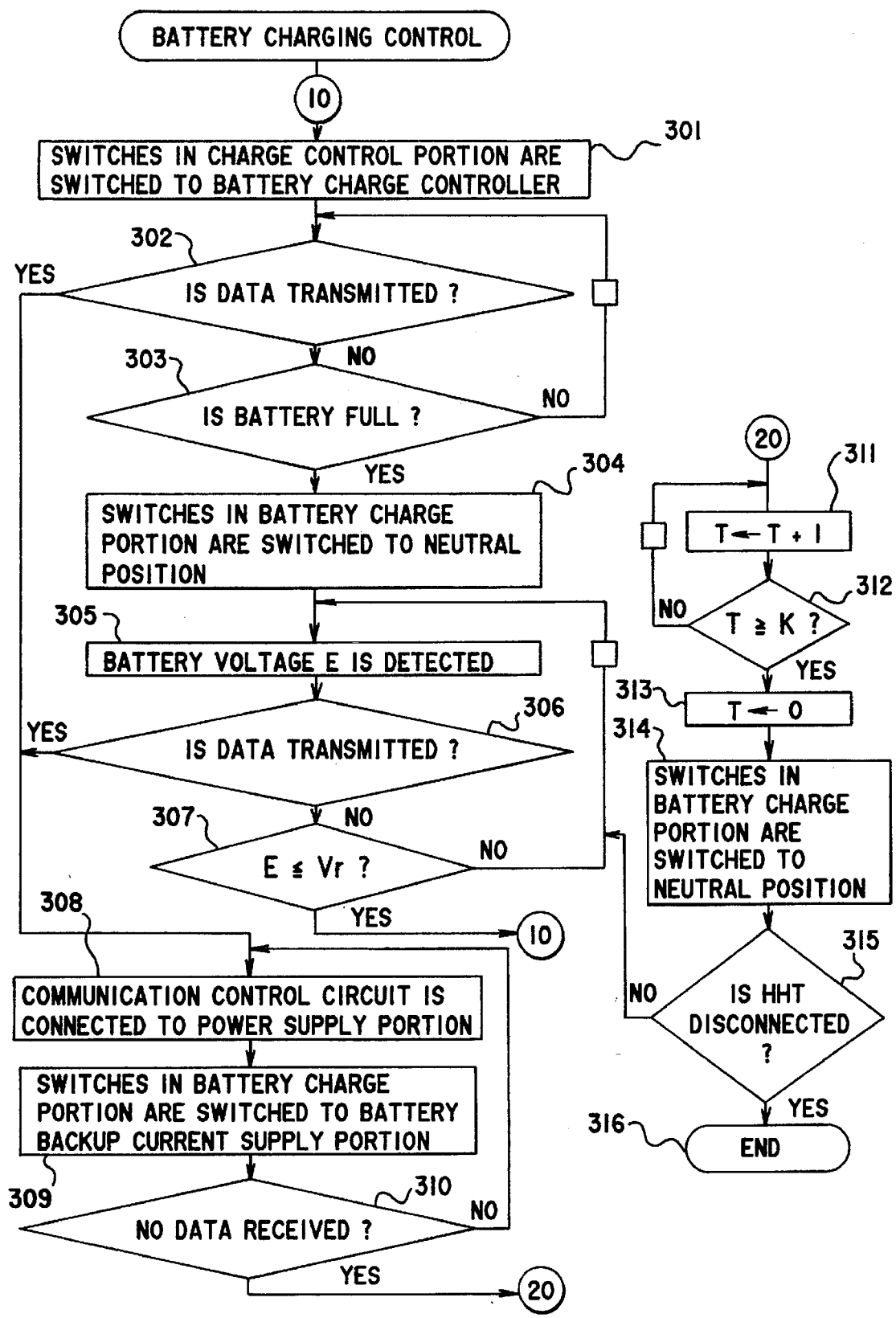
FIG. 25 is a flow chart illustrating the battery charging control sequence of the charging circuit of the transmission adapter according to the fifth embodiment of the present invention.

FIG. 25 is a flow chart illustrating the battery charging control sequence by the switching circuit 56 of the transmission adapter 2 according to the fifth embodiment of the present invention.

At step 301, the switches SW1 and SW2 in charge control portion 51 are switched to the battery charge controller 54. Namely, once the hand-held terminal 1 is connected to the transmission adapter 2 at step 301, the switching circuit 56 controls the switches SW1 and SW2 of the charge control circuit 51 to let the battery charge controller 54 charge the battery 102. At step 302, it is determined whether or not the data is transmitted. If the data is transmitted, the control proceeds to step 308, but if the data is not transmitted, the control proceeds to step 303.

At step 303, it is determined whether or not the battery 102 is fully charged.

If the battery 102 is not fully charged, the steps 302 and 303 are repeated after some interval. If the battery 102 is fully charged, the control proceeds to step 304 and the switching circuit 56 controls the switches SW1 and SW2 of the charge control portion 51 at neutral position to disconnect the battery charge controller 54, to stop charging the battery 102. Then at step 305, the voltage E of the battery 102 is detected.

At step 306, it is determined whether or not the data is transmitted. If the data is transmitted, the control proceeds to step 308, but if the data is not transmitted, the control proceeds to step 307.

At step 307, it is determined whether or not the voltage E of the battery 102 is smaller than or equal to a predetermined value Vr. If $E \leq Vr$, the control proceeds to step 301 and the switching circuit 56 controls the switches SW1 and SW2 to let the battery charge controller 54 resume the charging operation of the battery 102. But the E>Vr, the control proceeds to step 305 and steps 305 to 307 are repeated after some interval.

While carrying out the charging operation, the switching circuit 56 monitors at steps 302 and 306 whether or not there is transmission data. If there is transmission data, the switching circuit 56 controls the switch SW3 at step 308 to start supplying power to the communication control circuit 52 to enable communication between the host computer and the hand-held terminal 1. The switching circuit 56 connects at step 309 the switches SW1 and SW2 to the battery backup current supply circuit 55 to suspend the charging operation of the battery 102 and start supplying a minimum required current to the hand-held terminal 1 to carry out data transmission.

After the data communication between the host computer and the hand-held terminal 1 starts, the switching circuit 56 monitors at step 310 whether or not the communication data is received. If no data is received, the switching circuit 56 activates the timer at step 311. The switching circuit 56 determines whether or not the value of the timer T is larger than or equal to a predetermined value K. If T<K, the control proceeds to step 311 and the counting operation of the timer is repeated. If $T \geq K$ at step 312, that is, the communication stopped state is continuous for a predetermined period, the control proceeds to step 313 and the timer is reset. Then the switching circuit 56 controls the switch SW3 to a neutral position at step 314 to stop power to the communication control circuit 52. At step 315, it is determined whether or not the hand-held terminal 1 is disconnected from the data transmission controller 2. If the hand-held terminal 1 is disconnected, this routine is ended at step 316, but if the hand-held terminal 1 is not disconnected, the control proceeds to step 305 and the steps 305 to 307 are repeated, and if $E \leq Vr$ is detected at step 307, the control proceeds to step 301 and the switching circuit 56 controls the switches SW1 and SW2 of the charge control portion 51 to let the battery charge controller 54 resume the charging operation of the battery 102.

As explained above, this embodiment stops the charging operation of the hand-held terminal 1 during the operation period of the communication control circuit 52, thereby reducing the capacity of the power supply portion 50. This results in reducing the size of the power supply portion 50 of the transmission adapter 2, to minimize the apparatus as a whole.

If there is transmission data, this embodiment starts supplying power to the communication control circuit 52 and stops the charging operation. The hand-held terminal 1 is not required to provide a special instruction to stop the charging operation. This embodiment starts the communication control circuit 52 and stops the charging operation as an when required.

If the communication stopped state is continuous for a predetermined period, this embodiment quickly resumes the charging operation, to eliminate a loss of time in the charging operation.

What is claimed is:

1. A portable terminal unit which is driven by a battery, and is equipped with a control circuit, a keyboard, and connectors, said portable terminal unit comprising:

a casing having a first axle and a second axle thereupon;

a lid provided on a back surface of the casing, wherein an end of said lid is rotatably supported by the first axle;

a memory card holding mechanism having a connector for connecting a memory card, provided between the lid and a recess of the casing, wherein an end of said memory card holding mechanism is rotatably supported by the second axle provided on the casing; and an interlocking mechanism for interlocking a movement of the memory card holding mechanism with an opening and a closing movement of the lid, said interlocking mechanism comprising a bracket provided on a bottom face of the lid, a connector holder in the memory card holding mechanism, and a pin provided on the connector holder, said pin being inserted into the bracket.

2. A system as set forth in claim 1, wherein an opening angle of the lid is larger than an opening angle of the memory card holding mechanism.

* * * * *